US012021215B2

(12) United States Patent
Sonobe et al.

(10) Patent No.: US 12,021,215 B2
(45) Date of Patent: Jun. 25, 2024

(54) CONDUCTIVE PASTE FOR ELECTRODE MIXED MATERIAL LAYER, SLURRY FOR ELECTRODE MIXED MATERIAL LAYER, ELECTRODE FOR ELECTROCHEMICAL DEVICE, AND ELECTROCHEMICAL DEVICE

(71) Applicant: ZEON CORPORATION, Tokyo (JP)

(72) Inventors: Kenya Sonobe, Tokyo (JP); Yasuhiro Isshiki, Tokyo (JP); Maki Mesuda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 542 days.

(21) Appl. No.: 17/279,758

(22) PCT Filed: Oct. 3, 2019

(86) PCT No.: PCT/JP2019/039167
§ 371 (c)(1),
(2) Date: Mar. 25, 2021

(87) PCT Pub. No.: WO2020/075626
PCT Pub. Date: Apr. 16, 2020

(65) Prior Publication Data

US 2022/0037632 A1 Feb. 3, 2022

(30) Foreign Application Priority Data

Oct. 10, 2018 (JP) ................................ 2018-191983

(51) Int. Cl.
*H01M 4/36* (2006.01)
*H01M 4/04* (2006.01)

(52) U.S. Cl.
CPC ......... *H01M 4/0416* (2013.01); *H01M 4/364* (2013.01)

(58) Field of Classification Search
CPC .. H01M 4/0416; H01M 4/364; H01M 4/1391; H01M 10/4235; H01M 4/0404; H01M 4/139; H01M 4/623; H01M 4/624; H01M 4/62; H01M 10/052; H01G 11/24; H01G 11/36; H01G 11/50; H01G 11/86; H01G 11/06; H01G 11/38; Y02E 60/10
See application file for complete search history.

(56) References Cited

U.S. PATENT DOCUMENTS 10,090,527 B2 * 10/2018 Sonobe ................ C08F 236/10
10,964,947 B2 3/2021 Takahashi
2015/0050554 A1 2/2015 Fukumine et al.
2016/0329566 A1 11/2016 Jung et al.
2019/0140259 A1 5/2019 Ogaki et al.

FOREIGN PATENT DOCUMENTS

CN 107710471 A 2/2018
EP 3316360 A1 5/2018
JP 2004158362 A * 6/2004
JP 2005267966 A 9/2005
JP 2008226807 A 9/2008
JP 2012204303 A 10/2012
JP 2015211004 A 11/2015
JP 2016181324 A 10/2016
KR 2013 0084539 A * 7/2013
WO 2013080989 A1 6/2013
WO WO-2017043919 A1 * 3/2017 ........... C01B 32/158
WO 2017188043 A1 11/2017

OTHER PUBLICATIONS

English translation KR 2013 0084539 A as taught by Kang (Year: 2013).*
English translation JP-2004158362-A as taught by Koshiishi (Year: 2004).*
English translation WO2017043919A1 as taught by Cao (Year: 2017).*
Jul. 6, 2022, the Extended European Search Report issued by the European Patent Office in the corresponding European Patent Application No. 19871442.0.
Apr. 8, 2021, International Preliminary Report on Patentability issued in the International Patent Application No. PCT/JP2019/039167.
Dec. 24, 2019, International Search Report issued in the International Patent Application No. PCT/JP2019/039167.

* cited by examiner

*Primary Examiner* — Amanda C. Walke
(74) *Attorney, Agent, or Firm* — KENJA IP LAW PC

(57) ABSTRACT

A conductive paste for an electrode mixed material layer has a water content of 1,000 ppm or less. The paste contains a conductive additive, not less than 3 parts by mass and not more than 200 parts by mass of a polymer per 100 parts by mass of the conductive additive, and not less than 12 parts by mass and not more than 350 parts by mass of expandable particles per 100 parts by mass of the conductive additive. The polymer includes at least one functional group selected from the group consisting of a carboxyl group, a hydroxyl group, an amino group, an epoxy group, an oxazoline group, a sulfo group, a nitrile group, an ester group, and an amide group. The expandable particles have an initial thermal decomposition temperature of not lower than 120° C. and not higher than 400° C.

9 Claims, No Drawings

CONDUCTIVE PASTE FOR ELECTRODE MIXED MATERIAL LAYER, SLURRY FOR ELECTRODE MIXED MATERIAL LAYER, ELECTRODE FOR ELECTROCHEMICAL DEVICE, AND ELECTROCHEMICAL DEVICE

TECHNICAL FIELD

The present disclosure relates to a conductive paste for an electrode mixed material layer, a slurry for an electrode mixed material layer, an electrode for an electrochemical device, and an electrochemical device.

BACKGROUND

Electrochemical devices such as lithium ion secondary batteries, electric double-layer capacitors, and lithium ion capacitors have characteristics such as compact size, light weight, high energy-density, and the ability to be repeatedly charged and discharged, and are used in a wide range of applications. An electrochemical device typically includes a plurality of electrodes and one or more separators that isolate the electrodes from one another and prevent internal short circuiting.

Attempts have been made to improve separators with the aim of preventing internal short circuiting and ensuring safety of electrochemical devices. For example, Patent Literature (PTL) 1 reports that the safety of an electrochemical device can be increased by using a separator for an electrochemical device that includes a specific plurality of separator layers.

CITATION LIST

Patent Literature

PTL 1: JP2016-181324A

SUMMARY

Technical Problem

In recent years, diversification of applications and so forth has led to the need for new techniques for causing electrochemical devices to display excellent electrochemical characteristics while also inhibiting thermal runaway such as abnormal heat release and ignition caused by short circuiting between electrodes, and ensuring a higher level of safety in electrochemical devices.

Accordingly, an object of the present disclosure is to provide a technique relating to an electrochemical device in which there is a balance of having excellent electrochemical characteristics and ensuring a higher level of safety.

Solution to Problem

The inventors conducted diligent investigation with the aim of solving the problem described above. The inventors discovered that it is possible to cause the display of excellent electrochemical characteristics and to ensure a higher level of safety in an electrochemical device that includes an electrode including an electrode mixed material layer formed using a conductive paste that has a water content of not more than a specific value and that contains a conductive additive, a specific polymer, and specific expandable particles in specific proportions, and, in this manner, the inventors completed the present disclosure.

Specifically, the present disclosure aims to advantageously solve the problem set forth above, and a presently disclosed conductive paste for an electrode mixed material layer (hereinafter, also referred to simply as a "conductive paste") is a conductive paste for an electrode mixed material layer having a water content of 1,000 ppm or less and comprising: a conductive additive; not less than 3 parts by mass and not more than 200 parts by mass of a polymer per 100 parts by mass of the conductive additive; and not less than 12 parts by mass and not more than 350 parts by mass of expandable particles per 100 parts by mass of the conductive additive, wherein the polymer includes at least one functional group selected from the group consisting of a carboxyl group, a hydroxyl group, an amino group, an epoxy group, an oxazoline group, a sulfo group, a nitrile group, an ester group, and an amide group, and the expandable particles have an initial thermal decomposition temperature of not lower than 120° C. and not higher than 400° C. By forming an electrode mixed material layer using a conductive paste that has a water content of not more than a specific value, that contains a conductive additive, a polymer, and expandable particles in specific proportions, and in which the polymer includes a specific functional group and the expandable particles have an initial thermal decomposition temperature that is within a specific range in this manner, it is possible to cause the display of excellent electrochemical characteristics and to ensure a higher level of safety in an electrochemical device that includes an electrode including this electrode mixed material layer.

Note that the "water content" of a conductive paste for an electrode mixed material layer and the "initial thermal decomposition temperature" of expandable particles referred to in the present disclosure can be measured using methods described in the EXAMPLES section of the present specification.

In the presently disclosed conductive paste for an electrode mixed material layer, the conductive additive preferably has a specific surface area of 30 $m^2/g$ or more. According to the present disclosure, when the conductive additive has a specific surface area of 30 $m^2/g$ or more, it is possible to increase electrical conductivity in an electrode mixed material layer that is formed using a slurry for an electrode mixed material layer containing the presently disclosed conductive paste.

Note that the "specific surface area" of a conductive additive referred to in the present disclosure can be measured using a method described in the EXAMPLES section of the present specification.

In the presently disclosed conductive paste for an electrode mixed material layer, the functional group is preferably at least one selected from the group consisting of a carboxyl group, a hydroxyl group, and a nitrile group. When the polymer includes at least one selected from the group consisting of a carboxyl group, a hydroxyl group, and a nitrile group as a functional group, dispersibility of the conductive additive and the polymer in the conductive paste can be improved. Moreover, slurry stability of a slurry for an electrode mixed material layer that contains the conductive paste can be improved. Furthermore, electrode surface smoothness and electrode peel strength can be improved in an electrode for an electrochemical device that includes an electrode mixed material layer formed using the slurry for an electrode mixed material layer. Also, rate characteristics and high-temperature storage characteristics can be improved, and an even higher level of safety can be ensured in an electrochemical device that includes the electrode for an electrochemical device.

In the presently disclosed conductive paste for an electrode mixed material layer, the expandable particles preferably have a volume-average particle diameter of not less than 0.01 μm and not more than 1.00 μm. When the volume-average particle diameter of the expandable particles is 0.01 or more, dispersibility of the expandable particles in the conductive paste can be improved. Moreover, electrode peel strength can be further improved in an electrode that includes an electrode mixed material layer formed using a slurry for an electrode mixed material layer that contains the conductive paste. Furthermore, rate characteristics can be further improved in an electrochemical device that includes the electrode. Also, when the volume-average particle diameter of the expandable particles is 1.00 μm or less, sufficient electrochemical device safety is displayed.

Note that the "volume-average particle diameter" of expandable particles referred to in the present disclosure can be measured using a method described in the EXAMPLES section of the present specification.

The presently disclosed conductive paste for an electrode mixed material layer preferably has a water content of 300 ppm or less. When the water content of the conductive paste is 300 ppm or less, dispersibility of the expandable particles in the conductive paste can be further improved. Moreover, slurry stability can be further improved in a slurry for an electrode mixed material layer that contains the conductive paste. Furthermore, electrochemical characteristics can be further improved in an electrochemical device that includes an electrode including an electrode mixed material layer that is formed using the slurry for an electrode mixed material layer.

The presently disclosed conductive paste for an electrode mixed material layer preferably has a viscosity of less than 10,000 mPa·s as measured under conditions of 25° C. and 6 rpm using a B-type viscometer. When the viscosity of the conductive paste as measured under conditions of 25° C. and 6 rpm using a B-type viscometer is less than 10,000 mPa·s, dispersibility of the polymer and the expandable particles in the conductive paste can be further improved. Moreover, as a result of the conductive paste having better mixability when the viscosity of the conductive paste is less than the upper limit set forth above, electrode surface smoothness can be improved, and electrode peel strength can be further improved in an electrode for an electrochemical device that includes an electrode mixed material layer formed using a slurry for an electrode mixed material layer that contains the conductive paste. Furthermore, rate characteristics and high-temperature storage characteristics can be further improved, and an even higher level of safety can be ensured in an electrochemical device that includes the electrode for an electrochemical device.

Note that the "viscosity" of a conductive paste for an electrode mixed material layer referred to in the present disclosure can be measured using a method described in the EXAMPLES section of the present specification.

The presently disclosed conductive paste for an electrode mixed material layer preferably has a solid content concentration of not less than 3 mass % and not more than 50 mass %. When the conductive paste has a solid content concentration of 3 mass % or more, producibility and coatability of a slurry for an electrode mixed material layer that contains the conductive paste can be improved. Moreover, when the conductive paste has a solid content concentration of 50 mass % or less, dispersibility of the polymer and the expandable particles in the conductive paste can be even further improved, and producibility of the conductive paste can be improved.

Furthermore, the present disclosure aims to advantageously solve the problem set forth above, and a presently disclosed slurry for an electrode mixed material layer comprises: any one of the conductive pastes for an electrode mixed material layer set forth above; and an electrode active material. By using a slurry for an electrode mixed material layer that contains any one of the conductive pastes set forth above in this manner, it is possible to form an electrode mixed material layer that can cause the display of excellent electrochemical characteristics and can provide a high level of safety.

Moreover, the present disclosure aims to advantageously solve the problem set forth above, and a presently disclosed electrode for an electrochemical device comprises an electrode mixed material layer on a current collector, wherein the electrode mixed material layer is a dried product of the slurry for an electrode mixed material layer set forth above. When an electrode mixed material layer of an electrode for an electrochemical device is a dried product of the presently disclosed slurry for an electrode mixed material layer in this manner, it is possible to provide an electrode for an electrochemical device that has excellent electrochemical characteristics and can ensure a high level of safety.

Also, the present disclosure aims to advantageously solve the problem set forth above, and a presently disclosed electrochemical device comprises the electrode for an electrochemical device set forth above. When an electrochemical device includes the presently disclosed electrode for an electrochemical device in this manner, it is possible to provide an electrochemical device that has excellent electrochemical characteristics and can ensure a higher level of safety.

Advantageous Effect

According to the present disclosure, it is possible to provide a conductive paste for an electrode mixed material layer and a slurry for an electrode mixed material layer that can provide an electrochemical device in which there is a balance of having excellent electrochemical characteristics and ensuring a higher level of safety.

Moreover, according to the present disclosure, it is possible to provide an electrode for an electrochemical device in which there is a balance of having excellent electrochemical characteristics and ensuring a higher level of safety.

Furthermore, according to the present disclosure, it is possible to provide an electrochemical device that displays excellent electrochemical characteristics and in which a high level of safety is ensured.

DETAILED DESCRIPTION

The following provides a detailed description of embodiments of the present disclosure.

The presently disclosed conductive paste for an electrode mixed material layer can be used in production of the presently disclosed slurry for an electrode mixed material layer.

Moreover, the presently disclosed electrode for an electrochemical device can be used as an electrode of an electrochemical device such as a lithium ion secondary battery, an all-solid-state lithium ion secondary battery, an electric double-layer capacitor, or a lithium ion capacitor, and includes an electrode mixed material layer that is formed using the presently disclosed slurry for an electrode mixed material layer.

Furthermore, the presently disclosed electrochemical device includes the presently disclosed electrode for an electrochemical device.

(Conductive Paste for Electrode Mixed Material Layer)

The presently disclosed conductive paste for an electrode mixed material layer has a water content of 1,000 ppm or less, contains a conductive additive, a specific polymer, and specific expandable particles in specific proportions, and can optionally further contain a solvent and other components.

<Conductive Additive>

The conductive additive is a component that, in an electrochemical device, increases the electrical conductivity of an electrode mixed material layer of an electrode for an electrochemical device. Examples of conductive additives that can be used include, but are not specifically limited to, conductive carbon materials and fibers, foils, and particles of various metals. Examples of conductive carbon materials include carbon black (for example, acetylene black, Ketjenblack® (Ketjenblack is a registered trademark in Japan, other countries, or both), and furnace black), single-walled or multi-walled carbon nanotubes (multi-walled carbon nanotubes are inclusive of cup-stacked carbon nanotubes), carbon nanohorns, vapor-grown carbon fiber, milled carbon fiber obtained by pyrolyzing and then pulverizing polymer fiber, single layer or multilayer graphene, and carbon nonwoven fabric sheet obtained through pyrolysis of nonwoven fabric made from polymer fiber.

Note that one conductive additive may be used individually, or two or more conductive additives may be used in combination in a freely selected ratio.

[Specific Surface Area]

The specific surface area of the conductive additive is preferably 30 $m^2/g$ or more, more preferably 40 $m^2/g$ or more, and even more preferably 100 $m^2/g$ or more, and is preferably 2,000 $m^2/g$ or less, more preferably 1,500 $m^2/g$ or less, and even more preferably 1,000 $m^2/g$ or less. When the specific surface area of the conductive additive is 30 $m^2/g$ or more, an electrode mixed material layer having excellent electrical conductivity can be formed using a slurry for an electrode mixed material layer that contains the presently disclosed conductive paste even in a case in which only a small amount of the conductive additive is included. Moreover, when the specific surface area of the conductive additive is 2,000 $m^2/g$ or less, dispersibility of the conductive additive can be increased.

<Polymer>

The polymer is a component that can inhibit detachment of components such as the conductive additive and the expandable particles from an electrode mixed material layer that is formed using a slurry for an electrode mixed material layer containing the presently disclosed conductive paste.

<<Functional Group of Polymer>>

The polymer is required to include at least one selected from the group consisting of a carboxyl group, a hydroxyl group, an amino group, an epoxy group, an oxazoline group, a sulfo group, a nitrile group, an ester group, and an amide group (hereinafter, these functional groups are also referred to collectively as "prescribed functional groups").

Of these groups, at least one selected from the group consisting of a carboxyl group, a hydroxyl group, and a nitrile group is preferable as a prescribed functional group from a viewpoint of improving dispersibility of the conductive additive and the polymer in the conductive paste and also improving electrode surface smoothness and electrode peel strength in an electrode for an electrochemical device that includes an electrode mixed material layer formed using a slurry for an electrode mixed material layer that contains the conductive paste.

No specific limitations are placed on the method by which any of the prescribed functional groups is introduced into the polymer. A polymer may be produced using a monomer that includes any of the prescribed functional groups (prescribed functional group-containing monomer) so as to obtain a polymer that includes a prescribed functional group-containing monomer unit, or end modification of any polymer may be performed to obtain a polymer that includes any of the prescribed functional groups at an end thereof, but the former of these methods is preferable. In other words, the polymer preferably includes at least one of a carboxyl group-containing monomer unit, a hydroxyl group-containing monomer unit, an amino group-containing monomer unit, an epoxy group-containing monomer unit, an oxazoline group-containing monomer unit, a sulfo group-containing monomer unit, a nitrile group-containing monomer unit, an ester group-containing monomer unit, and an amide group-containing monomer unit as a prescribed functional group-containing monomer unit, and more preferably includes at least one of a carboxyl group-containing monomer unit, a hydroxyl group-containing monomer unit, and a nitrile group-containing monomer unit as a prescribed functional group-containing monomer unit.

[Carboxyl Group-Containing Monomer Unit]

Examples of carboxyl group-containing monomers that can form a carboxyl group-containing monomer unit include monocarboxylic acids, derivatives of monocarboxylic acids, dicarboxylic acids, acid anhydrides of dicarboxylic acids, and derivatives of dicarboxylic acids and acid anhydrides thereof.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, and α-chloro-β-E-methoxyacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid monoesters such as nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Moreover, an acid anhydride that produces a carboxyl group upon hydrolysis can be used as a carboxyl group-containing monomer. Of these carboxyl group-containing monomers, acrylic acid and methacrylic acid are preferable. Note that one carboxyl group-containing monomer may be used individually, or two or more carboxyl group-containing monomers may be used in combination in a freely selected ratio. Also note that in the present disclosure, monomers that include a carboxyl group are considered to be included among carboxyl group-containing monomers even in a case in which they also include a functional group other than a carboxyl group.

[Hydroxyl Group-Containing Monomer Unit]

Examples of hydroxyl group-containing monomers that can form a hydroxyl group-containing monomer unit include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, 2-hydroxypropyl methacrylate, di-2-hydroxyethyl maleate, di-4-hydroxybutyl maleate, and di-2-hydroxypropyl itaconate; esters of (meth)acrylic acid and polyalkylene glycol represented by a general formula $CH_2{=}CR^a{-}COO{-}(C_qH_{2q}O)_p{-}H$ (where p represents an integer of 2 to 9, q represents an integer of 2 to 4, and $R^a$ represents a hydrogen atom or a methyl group); mono(meth) acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether, (meth)allyl-2-hydroxypropyl ether, (meth)allyl-3-hydroxypropyl ether, (meth)allyl-2-hydroxybutyl ether, (meth)allyl-3-hydroxybutyl ether, (meth)allyl-4-hydroxybutyl ether, and (meth)allyl-6-hydroxyhexyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether, (meth)allyl-2-chloro-3-hydroxypropyl ether, and (meth)allyl-2-hydroxy-3-chloropropyl ether; mono(meth)allyl ethers of polyhydric phenols such as eugenol and isoeugenol, and halogen substituted products thereof; (meth)allyl thioethers of alkylene glycols such as (meth)allyl-2-hydroxyethyl thioether and (meth)allyl-2-hydroxypropyl thioether; and hydroxyl group-containing amides such as N-hydroxymethylacrylamide (N-methylolacrylamide), N-hydroxymethylmethacrylamide, N-hydroxyethylacrylamide, and N-hydroxyethylmethacrylamide. Note that one hydroxyl group-containing monomer may be used individually, or two or more hydroxyl group-containing monomers may be used in combination in a freely selected ratio.

In the present disclosure, "(meth)allyl" is used to indicate "allyl" and/or "methallyl", and "(meth)acryloyl" is used to indicate "acryloyl" and/or "methacryloyl". Also note that in the present disclosure, monomers that include a hydroxyl group are considered to be included among hydroxyl group-containing monomers even in a case in which they also include a functional group other than a hydroxyl group.

[Amino Group-Containing Monomer Unit]

Examples of amino group-containing monomers that can form an amino group-containing monomer unit include dimethylaminoethyl (meth)acrylate, diethylaminoethyl (meth)acrylate, aminoethyl vinyl ether, and dimethylaminoethyl vinyl ether. Note that one amino group-containing monomer may be used individually, or two or more amino group-containing monomers may be used in combination in a freely selected ratio.

In the present disclosure, "(meth)acrylate" is used to indicate "acrylate" and/or "methacrylate".

[Epoxy Group-Containing Monomer Unit]

Examples of epoxy group-containing monomers that can form an epoxy group-containing monomer unit include monomers that include a carbon-carbon double bond and an epoxy group.

Examples of monomers that include a carbon-carbon double bond and an epoxy group include unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid. Note that one epoxy group-containing monomer may be used individually, or two or more epoxy group-containing monomers may be used in combination in a freely selected ratio.

[Oxazoline Group-Containing Monomer Unit]

Examples of oxazoline group-containing monomers that can form an oxazoline group-containing monomer unit include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline. Note that one oxazoline group-containing monomer may be used individually, or two or more oxazoline group-containing monomers may be used in combination in a freely selected ratio.

[Sulfo Group-Containing Monomer Unit]

Examples of sulfo group-containing monomers that can form a sulfo group-containing monomer unit include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid. Note that one sulfo group-containing monomer may be used individually, or two or more sulfo group-containing monomers may be used in combination in a freely selected ratio.

[Nitrile Group-Containing Monomer Unit]

Examples of nitrile group-containing monomers that can form a nitrile group-containing monomer unit include α,β-ethylenically unsaturated nitrile monomers. Specifically, any α,β-ethylenically unsaturated compound that includes a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Note that one nitrile group-containing monomer may be used individually, or two or more nitrile group-containing monomers may be used in combination in a freely selected ratio.

[Ester Group-Containing Monomer Unit]

Examples of compounds that can form an ester group-containing monomer unit include polybutyl acetals such as polyvinyl butyral and polyvinyl formal. Note that one ester group-containing monomer may be used individually, or two or more ester group-containing monomers may be used in combination in a freely selected ratio.

[Amide Group-Containing Monomer Unit]

Examples of amide group-containing monomers that can form an amide group-containing monomer unit include acrylamide and methacrylamide. Note that one amide group-containing monomer may be used individually, or two or more amide group-containing monomers may be used in combination in a freely selected ratio.

The polymer may include a monomer unit of a monomer other than the prescribed functional group-containing monomers described above and/or an alkylene structural unit. Note that an alkylene structural unit is a repeating unit composed of only an alkylene structure represented by a general formula: $-C_nH_{2n}-$ (n is an integer of 2 or more).

Examples of other monomer units include an aromatic vinyl monomer unit and a (meth)acrylic acid ester monomer unit. Examples of aromatic vinyl monomers that can form an aromatic vinyl monomer unit include styrene. Examples of (meth)acrylic acid ester monomers that can form a (meth) acrylic acid ester monomer unit include n-butyl acrylate and 2-ethylhexyl acrylate.

The alkylene structural unit may be a structural unit obtained through hydrogenation of a conjugated diene monomer unit (i.e., a hydrogenated conjugated diene unit) such as a structural unit obtained through hydrogenation of a 1,3-butadiene unit (i.e., a hydrogenated 1,3-butadiene unit).

The proportional content of prescribed functional group-containing monomer units in the polymer when the amount of all monomer units included in the polymer is taken to be 100 mass % is preferably 0.3 mass % or more, and more preferably 0.5 mass % or more, and is preferably 90 mass % or less, and more preferably 80 mass % or less. When the proportional content of prescribed functional group-containing monomer units in the polymer is within any of the ranges set forth above, an electrode mixed material layer having excellent adhesiveness to a current collector can be formed using the presently disclosed conductive paste.

[Production Method of Polymer]

In the present disclosure, no specific limitations are placed on the method by which the polymer is produced. The polymer may be produced, for example, through polymerization of a monomer composition that contains the monomers set forth above, carried out in an aqueous solvent. Note that the proportional content of each monomer in the monomer composition can be set in accordance with the desired proportional content of each monomer unit (repeating unit) in the polymer.

The method of polymerization is not specifically limited and can be any of solution polymerization, suspension polymerization, bulk polymerization, and emulsion polymerization, for example. Moreover, ionic polymerization, radical polymerization, living radical polymerization, various types of condensation polymerization, addition polymerization, and so forth can be adopted as the polymerization reaction. Furthermore, a known emulsifier and/or polymerization initiator can be used in the polymerization as necessary.

<<Type of Polymer>>

The polymer may, for example, be a polymer that includes a nitrile group-containing monomer unit (acrylonitrile unit) and an alkylene structural unit (hydrogenated 1,3-butadiene unit); a styrene-acrylonitrile-butadiene copolymer (butadiene units may be hydrogenated); an acrylonitrile-butadiene copolymer (butadiene units may be hydrogenated); a polyacrylonitrile (PAN) copolymer; polybutyral; polyvinyl butyral; a polymer that includes an amide group-containing monomer unit; polyvinylpyrrolidone; or the like.

One of these polymers may be used individually, or two or more of these polymers may be used in combination in a freely selected ratio.

Of these polymers, a polymer that includes a nitrile group-containing monomer unit (acrylonitrile unit) and an alkylene structural unit (hydrogenated 1,3-butadiene unit); a styrene-acrylonitrile-butadiene copolymer (butadiene units may be hydrogenated); an acrylonitrile-butadiene copolymer (butadiene units may be hydrogenated); polyvinylpyrrolidone; polyvinyl butyral; or a polyacrylonitrile (PAN) copolymer is preferable from a viewpoint of electrochemical stability of the polymer and production of an electrode or the like of an electrochemical device, with a polymer that includes a nitrile group-containing monomer unit (acrylonitrile unit) and an alkylene structural unit (hydrogenated 1,3-butadiene unit); a styrene-acrylonitrile-butadiene copolymer (butadiene units may be hydrogenated); an acrylonitrile-butadiene copolymer (butadiene units may be hydrogenated); or a polyacrylonitrile (PAN) copolymer being more preferable, and a polymer that includes a nitrile group-containing monomer unit (acrylonitrile unit) and an alkylene structural unit (hydrogenated 1,3-butadiene unit); a styrene-acrylonitrile-butadiene copolymer (butadiene units include hydrogenated units); an acrylonitrile-butadiene copolymer (butadiene units may be hydrogenated); or a polyacrylonitrile (PAN) copolymer being even more preferable.

The phrase "includes a monomer unit" as used in the present disclosure means that "a polymer obtained with the monomer includes a repeating unit derived from the monomer".

[Proportional Content of Polymer]

The proportional content of the polymer in the conductive paste, in terms of solid content, is required to be 3 parts by mass or more, is preferably 5 parts by mass or more, is more preferably 10 parts by mass or more, and is even more preferably 30 parts by mass or more per 100 parts by mass of the conductive additive, and is required to be 200 parts by mass or less, is preferably 195 parts by mass or less, is more preferably 190 parts by mass or less, and is even more preferably 180 parts by mass or less per 100 parts by mass of the conductive additive. Through the proportional content of the polymer being not less than any of the lower limits set forth above, the conductive additive has better dispersibility in the conductive paste. Consequently, a slurry for an electrode mixed material layer having excellent slurry stability can be produced using the presently disclosed conductive paste. Moreover, an electrode that includes an electrode mixed material layer formed using the slurry for an electrode mixed material layer has excellent electrode peel strength. Furthermore, it is possible to cause the display of excellent rate characteristics and high-temperature storage characteristics and to ensure a high level of safety in an electrochemical device that includes the electrode.

<Expandable Particles>

The expandable particles according to the present disclosure are particles formed of a component that starts to thermally decompose and release incombustible gas at a prescribed temperature. The incombustible gas that is released by the expandable particles may be nitrogen, carbon dioxide, carbon monoxide, ammonia, water vapor, or the like.

The initial thermal decomposition temperature of the expandable particles according to the present disclosure is required to be 120° C. or higher, is preferably 140° C. or higher, is more preferably 160° C. or higher, and is even more preferably 180° C. or higher, and is required to be 400° C. or lower, is preferably 350° C. or lower, is more preferably 300° C. or lower, and is even more preferably 240° C. or lower. Through the initial thermal decomposition temperature of the expandable particles being 120° C. or higher, it is possible to inhibit thermal decomposition of the expandable particles other than during abnormal heating and to inhibit deterioration of high-temperature storage characteristics in an electrochemical device that is produced using a slurry for an electrode mixed material layer containing the presently disclosed conductive paste. Moreover, through the initial thermal decomposition temperature of the expandable particles being 400° C. or lower, it is possible to ensure a higher level of safety in an electrochemical device that is produced using a slurry for an electrode mixed material layer containing the presently disclosed conductive paste.

The compound forming the expandable particles according to the present disclosure may, for example, be p-toluenesulfonyl hydrazide, 5-methyl-1H-benzotriazole, oxybis (benzenesulfonyl hydrazide), trihydrazine triazine, azodicarbonamide, hydrazo-dicarbonamide, dinitrosopentamethylenetetramine, p-toluenesulfonyl semicarbazide, p,p'-oxybis(benzenesulfonyl semicarbazide), a melamine compound, or the like.

Examples of the melamine compound include melamine, derivatives of melamine, and salts of melamine and derivatives thereof.

The melamine or derivative of melamine may, for example, be a compound represented by the following formula (I).

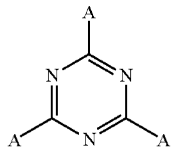

(I)

In formula (I), each A represents, independently of one another, a hydroxyl group or —$NR^1R^2$ ($R^1$ and $R^2$ each represent, independently of one another, a hydrogen atom, a hydrocarbon group, or a hydroxyl group-containing hydrocarbon group; when more than one $R^1$ is present in formula (I), each $R^1$ may be the same or different; and when more than one $R^2$ is present in formula (I), each $R^2$ may be the same or different).

Note that when the hydrocarbon group and the hydroxyl group-containing hydrocarbon group of $R^1$ and $R^2$ include two or more carbon atoms, these groups may have one or more oxygen atoms (—O—) interposed between carbon atoms (however, when two or more oxygen atoms are interposed, these oxygen atoms are not adjacent to one another). The number of carbon atoms in the hydrocarbon group and the hydroxyl group-containing hydrocarbon group of $R^1$ and $R^2$ is not specifically limited but is preferably not less than 1 and not more than 5.

Moreover, examples of salts of melamine and derivatives of melamine include, but are not specifically limited to, sulfates and cyanurates.

Specific examples of melamine compounds include melamine (initial thermal decomposition temperature: 200° C.), ammeline (initial thermal decomposition temperature: 300° C.), ammelide (initial thermal decomposition temperature: 350° C.), and melamine cyanurate (initial thermal decomposition temperature: 350° C.).

Note that one of these types of expandable particles may be used individually, or two or more of these types of expandable particles may be used in combination in a freely selected ratio.

Of these examples, p-toluenesulfonyl hydrazide, 5-methyl-1H-benzotriazole, oxybis(benzenesulfonyl hydrazide), trihydrazine triazine, azodicarbonamide, hydrazo-dicarbonamide, dinitrosopentamethylenetetramine, p-toluenesulfonyl semicarbazide, p,p'-oxybis(benzenesulfonyl semicarbazide), melamine cyanurate, and melamine are preferable as the compound forming the expandable particles from a viewpoint of ensuring an even higher level of safety of an electrochemical device.

Moreover, oxybis(benzenesulfonyl hydrazide), trihydrazine triazine, azodicarbonamide, hydrazo-dicarbonamide, dinitrosopentamethylenetetramine, p-toluenesulfonyl semicarbazide, p,p'-oxybis(benzenesulfonyl semicarbazide), melamine cyanurate, and melamine are more preferable.

Furthermore, azodicarbonamide, hydrazo-dicarbonamide, dinitrosopentamethylenetetramine, p-toluenesulfonyl semicarbazide, p,p'-oxybis(benzenesulfonyl semicarbazide), melamine cyanurate, and melamine are even more preferable.

[Proportional Content of Expandable Particles]

The proportional content of the expandable particles in the conductive paste is required to be 12 parts by mass or more, is preferably 15 parts by mass or more, is more preferably 20 parts by mass or more, and is even more preferably 30 parts by mass or more per 100 parts by mass of the conductive additive, and is required to be 350 parts by mass or less, is preferably 330 parts by mass or less, is more preferably 300 parts by mass or less, and is even more preferably 250 parts by mass or less per 100 parts by mass of the conductive additive. Through the proportional content of the expandable particles being within any of the ranges set forth above, an even higher level of safety can be ensured in an electrochemical device that is produced using a slurry for an electrode mixed material layer containing the presently disclosed conductive paste. Moreover, through the proportional content of the expandable particles being not more than any of the upper limits set forth above, the expandable particles have better dispersibility in the conductive paste. Consequently, an electrode that includes an electrode mixed material layer formed using a slurry for an electrode mixed material layer that contains the conductive paste can display excellent electrode peel strength.

[Volume-Average Particle Diameter]

The volume-average particle diameter of the expandable particles is preferably 0.01 μm or more, more preferably 0.10 μm or more, and even more preferably 0.15 μm or more, and is preferably 1.00 μm or less, more preferably 0.80 μm or less, and even more preferably 0.50 μm or less. When the volume-average particle diameter of the expandable particles is not less than any of the lower limits set forth above, dispersibility of the expandable particles in the conductive paste further improves. Consequently, electrode peel strength can be further improved in an electrode that includes an electrode mixed material layer formed using a slurry for an electrode mixed material layer that contains the presently disclosed conductive paste. Moreover, rate characteristics can be further improved in an electrochemical device that includes the electrode. Furthermore, when the volume-average particle diameter of the expandable particles is not more than any of the upper limits set forth above, sufficient electrochemical device safety is displayed.

<Solvent>

The solvent that can be contained in the conductive paste may be an organic solvent. Specifically, acetonitrile, N-methylpyrrolidone (NMP), acetylpyridine, cyclopentanone, N,N-dimethylacetamide, dimethylformamide, dimethyl sulfoxide, methylformamide, methyl ethyl ketone, furfural, ethylenediamine, or the like can be used as the organic solvent. Of these solvents, the organic solvent is most preferably N-methylpyrrolidone from a viewpoint of ease of handling, safety, and ease of synthesis.

Note that one of these organic solvents may be used individually, or two or more of these organic solvents may be used as a mixture.

<Other Components>

In addition to the components set forth above, the presently disclosed conductive paste may contain known components such as cross-linkers, reinforcing materials, antioxidants, dispersants, rheological modifiers, and additives for electrolyte solution that inhibit decomposition of electrolyte solution. Moreover, one of these other components may be included, or two or more of these other components may be included in freely selected proportions.

<Production Method of Conductive Paste>

The presently disclosed conductive paste can be produced by mixing the above-described conductive additive, polymer, solvent, and other components. Specifically, the conductive paste can be produced by dissolving or dispersing the above-described components in the solvent. The mixing method used to obtain the conductive paste is not specifically limited and may involve using a typical mixer such as a disper blade, a mill, or a kneader.

<Water Content>

The water content of the presently disclosed conductive paste is required to be 1,000 ppm or less, is normally 10 ppm or more, preferably 30 ppm or more, more preferably 40 ppm or more, and even more preferably 50 ppm or more, and is preferably 800 ppm or less, more preferably 600 ppm or less, even more preferably 400 ppm or less, and particularly preferably 300 ppm or less. Through the water content of the conductive paste being 1,000 ppm or less, the conductive paste is stabilized, and a slurry for an electrode mixed material layer that contains the conductive paste can also be stabilized.

<Viscosity>

The viscosity of the presently disclosed conductive paste as measured under conditions of 25° C. and 6 rpm using a B-type viscometer is preferably less than 10,000 mPa·s, more preferably less than 8,000 mPa·s, and even more preferably less than 5,000 mPa·s, and is preferably 10 mPa·s or more, more preferably 50 mPa·s or more, and even more preferably 100 mPa·s or more. When the viscosity of the conductive paste as measured under conditions of 25° C. and 6 rpm using a B-type viscometer is less than 10,000 mPa·s, dispersibility of the polymer and the expandable particles in the conductive paste can be further improved. Moreover, electrode surface smoothness can be further improved, and electrode peel strength can be further improved in an electrode for an electrochemical device that includes an electrode mixed material layer formed using a slurry for an electrode mixed material layer that contains the conductive paste. Furthermore, rate characteristics and high-temperature storage characteristics can be further improved, and an even higher level of safety can be ensured in an electrochemical device that includes the electrode for an electrochemical device.

The viscosity of the conductive paste can be adjusted through the chemical composition of the conductive paste, the solid content concentration of the conductive paste, and so forth.

<Solid Content Concentration>

The solid content concentration of the conductive paste is preferably 3 mass % or more, more preferably 5 mass % or more, and even more preferably 10 mass % or more, and is preferably 50 mass % or less, more preferably 40 mass % or less, and even more preferably 30 mass % or less. When the solid content concentration of the conductive paste is not less than any of the lower limits set forth above, producibility and coatability of a slurry for an electrode mixed material layer that contains the presently disclosed conductive paste can be improved. Moreover, when the solid content concentration of the conductive paste is not more than any of the upper limits set forth above, dispersibility of the polymer and the expandable particles in the conductive paste can be even further improved, and producibility of the conductive paste can be improved.

(Slurry for Electrode Mixed Material Layer)

The presently disclosed slurry for an electrode mixed material layer contains the conductive paste set forth above and an electrode active material and can optionally further contain a solvent, another polymer, and other components.

<Electrode Active Material>

The electrode active material is a material that gives and receives electrons in an electrode of an electrochemical device. In a case in which the electrochemical device is a lithium ion secondary battery, for example, the electrode active material is normally a material that can occlude and release lithium.

Although the following describes, as one example, a case in which the slurry for an electrode mixed material layer is a slurry for an electrode mixed material layer of an electrode for a lithium ion secondary battery, the presently disclosed slurry for an electrode mixed material layer is not limited to the following example.

<<Positive Electrode Active Material>>

Examples of positive electrode active materials include, but are not specifically limited to, lithium-containing cobalt oxide ($LiCoO_2$), lithium manganate ($LiMn_2O_4$), lithium-containing nickel oxide ($LiNiO_2$), lithium-containing complex oxide of Co—Ni—Mn, lithium-containing complex oxide of Ni—Mn—Al, lithium-containing complex oxide of Ni—Co—Al, olivine-type lithium iron phosphate ($LiFePO_4$), olivine-type lithium manganese phosphate ($LiMnPO_4$), lithium-rich spinel compounds represented by $Li_{1+x}Mn_{2-x}O_4$ ($0<x<2$), $Li[Ni_{0.17}Li_{0.2}Co_{0.07}Mn_{0.56}]O_2$, and $LiNi_{0.5}Mn_{1.5}O_4$.

The amount and particle diameter of the positive electrode active material are not specifically limited and may be the same as those of conventionally used positive electrode active materials.

<<Negative Electrode Active Material>>

Examples of negative electrode active materials include, but are not specifically limited to, carbon-based negative electrode active materials, metal-based negative electrode active materials, and negative electrode active materials that are a combination thereof.

[Carbon-Based Negative Electrode Active Material]

A carbon-based negative electrode active material can be defined as an active material that contains carbon as its main framework and into which lithium can be inserted (also referred to as "doping"). Examples of carbon-based negative electrode active materials include carbonaceous materials and graphitic materials.

—Carbonaceous Material—

Examples of carbonaceous materials include graphitizing carbon and non-graphitizing carbon, typified by glassy carbon, which has a structure similar to an amorphous structure.

The graphitizing carbon may be a carbon material made using tar pitch obtained from petroleum or coal as a raw material. Specific examples of graphitizing carbon include coke, mesocarbon microbeads (MCMB), mesophase pitch-based carbon fiber, and pyrolytic vapor-grown carbon fiber.

Examples of the non-graphitizing carbon include pyrolyzed phenolic resin, polyacrylonitrile-based carbon fiber, quasi-isotropic carbon, pyrolyzed furfuryl alcohol resin (PFA), and hard carbon.

—Graphitic Material—

Examples of graphitic materials include natural graphite and artificial graphite.

Examples of the artificial graphite include artificial graphite obtained by heat-treating carbon containing graphitizing carbon mainly at 2800° C. or higher, graphitized MCMB obtained by heat-treating MCMB at 2000° C. or higher, and graphitized mesophase pitch-based carbon fiber obtained by heat-treating mesophase pitch-based carbon fiber at 2000° C. or higher. Note that, in the present disclosure, natural graphite that is at least partially coated by amorphous carbon at the surface thereof (amorphous-coated natural graphite) may be used as a carbon-based negative electrode active material.

[Metal-Based Negative Electrode Active Material]

The metal-based negative electrode active material is an active material that contains metal, the structure of which usually contains an element that allows insertion of lithium, and that has a theoretical electric capacity per unit mass of 500 mAh/g or more when lithium is inserted. Examples of the metal-based negative electrode active material include lithium metal; a simple substance of metal that can form a lithium alloy (for example, Ag, Al, Ba, Bi, Cu, Ga, Ge, In, Ni, P, Pb, Sb, Si, Sn, Sr, Zn, or Ti); alloys of the simple substance of metal; and oxides, sulfides, nitrides, silicides, carbides, and phosphides of lithium metal, the simple substance of metal, and the alloys of the simple substance of metal. Of these metal-based negative electrode active materials, active materials containing silicon (silicon-based negative electrode active materials) are preferred. One reason for this is that the capacity of a lithium ion secondary battery can be increased through use of a silicon-based negative electrode active material.

—Silicon-Based Negative Electrode Active Material—

Examples of the silicon-based negative electrode active material include silicon (Si), a silicon-containing alloy, SiO, $SiO_x$, and a composite material of conductive carbon and a Si-containing material obtained by coating or combining the Si-containing material with the conductive carbon.

<Solvent>

The solvent that can be contained in the slurry for an electrode mixed material layer may be an organic solvent. Examples of organic solvents that can be used include, but are not specifically limited to, the same components as the solvents that can be contained in the conductive paste set forth above.

Note that one of these solvents may be used individually, or two or more of these solvents may be used as a mixture.

<Other Polymer>

The other polymer functions as a binder in conjunction with the polymer that is contained in the conductive paste. The other polymer is not normally specifically limited so long as it is a polymer that does not include any of the prescribed functional groups described above. The other polymer may be a fluorine-containing polymer such as polyvinylidene fluoride, polyacrylonitrile, polymethyl methacrylate, or the like. Of these examples, a fluorine-containing polymer is preferable as the other polymer, and polyvinylidene fluoride is more preferable as the other polymer.

<Other Components>

Examples of other components that can be contained in the slurry for an electrode mixed material layer include, but are not specifically limited to, the same components as the other components that can be contained in the conductive paste set forth above.

One other component may be used individually, or two or more other components may be used in combination in a freely selected ratio.

<Production Method of Slurry for Electrode Mixed Material Layer>

The presently disclosed slurry for an electrode mixed material layer can be produced by mixing the above-described conductive paste, the electrode active material, and the other polymer and other components that can optionally be used. The content of the conductive paste in the slurry for an electrode mixed material layer is not specifically limited, but is preferably 5 parts by mass or more, more preferably 10 parts by mass or more, and even more preferably 15 parts by mass or more per 100 parts by mass of the electrode active material, and is preferably 50 parts by mass or less, more preferably 40 parts by mass or less, and even more preferably 30 parts by mass or less per 100 parts by mass of the electrode active material. When the content of the conductive paste in the slurry for an electrode mixed material layer is within any of the ranges set forth above, the viscosity of the slurry for an electrode mixed material layer can be set as a viscosity with which dripping and streaking do not easily occur during application of the slurry. Moreover, an electrode obtained using the slurry for an electrode mixed material layer tends to have excellent electrochemical stability.

Mixing of the above-described components can be performed with the components in a dissolved state or a dispersed state in the organic solvent. Specifically, the slurry for an electrode mixed material layer can be produced by mixing the above-described components using a mixer such as a ball mill, a sand mill, a bead mill, a pigment disperser, a grinding machine, an ultrasonic disperser, a homogenizer, a planetary mixer, or a FILMIX. Note that the organic solvent may be just organic solvent that was contained in the conductive paste, or further organic solvent may be added and mixed.

(Electrode for Electrochemical Device)

The presently disclosed electrode for an electrochemical device includes a current collector and an electrode mixed material layer formed on the current collector. The electrode mixed material layer is a dried product of the presently disclosed slurry for an electrode mixed material layer. Note that the presently disclosed electrode for an electrochemical device may optionally include a layer (for example, a subsequently described functional layer) other than the electrode mixed material layer. The presently disclosed electrode for an electrochemical device can be used as an electrode of an electrochemical device such as a lithium ion secondary battery, an all-solid-state lithium ion secondary battery, an electric double-layer capacitor, or a lithium ion capacitor.

Note that components contained in the electrode mixed material layer are components that were contained in the presently disclosed slurry for an electrode mixed material layer, and the preferred ratio of these components is the same as the preferred ratio of the components in the presently disclosed slurry for an electrode mixed material layer.

<Current Collector>

The current collector of the electrode for an electrochemical device is not specifically limited so long as it is a material having electrical conductivity and electrochemical durability, and may be selected in accordance with the type of electrochemical device. In a case in which the electrode for an electrochemical device is an electrode for a lithium ion secondary battery, the material forming the current collector may be iron, copper, aluminum, nickel, stainless steel, titanium, tantalum, gold, platinum, or the like. Of these materials, copper foil is particularly preferable as a current collector used for a negative electrode. On the other hand, aluminum foil is particularly preferable as the material forming a current collector used for a positive electrode.

Note that one of these materials may be used individually, or two or more of these materials may be used in combination in a freely selected ratio.

<Electrode Mixed Material Layer>

The electrode mixed material layer that is formed using the presently disclosed slurry for an electrode mixed material layer is a dried product of the slurry for an electrode mixed material layer.

As a result of the electrode mixed material layer containing the presently disclosed conductive paste, the electrode mixed material layer can impart a high level of safety to the electrode for an electrochemical device. The reason that an electrode including an electrode mixed material layer that is formed using a slurry for an electrode mixed material layer containing the presently disclosed conductive paste can ensure a high level of safety of an electrochemical device is presumed to be as follows. First, when a short circuit occurs inside an electrochemical device due to contamination of the inside of the electrochemical device with foreign matter, a fault in electrode production, a mistake in design of the electrochemical device, or the like, the flow of current in a part where the short circuit has occurred leads to the release of Joule heat. It is thought that when this Joule heat causes melting of a separator and increases the area of the short-circuited part, combustibility that induces abnormal heat release and ignition caused by decomposition of electrolyte solution or the like arises inside the heated up electrochemical device.

However, as a result of the presently disclosed electrode for an electrochemical device containing expandable particles in the electrode mixed material layer, these expandable particles expand and release incombustible gas through thermal decomposition inside an electrochemical device that has reached a high temperature due to Joule heat. This release of incombustible gas destroys the electrode structure and cuts off conduction paths to thereby prevent overheating.

Note that through the expandable particles being contained in the electrode mixed material layer according to the present disclosure, rather than providing a layer that contains expandable particles between the electrode mixed material layer and the current collector, the expandable particles act in proximity to an electrode active material that is thermally unstable and releases oxygen, which is a combustible substance, and, as a result, improvement of safety can be further increased.

<Production Method of Electrode for Electrochemical Device>

No specific limitations are placed on the method by which the electrode for an electrochemical device is produced. For example, the electrode for an electrochemical device may be produced through a step of applying the slurry for an electrode mixed material layer onto at least one side of the current collector (application step) and a step of drying the slurry for an electrode mixed material layer that has been applied onto at least one side of the current collector to form an electrode mixed material layer on the current collector (drying step).

[Application Step]

The slurry for an electrode mixed material layer may be applied onto the current collector by any commonly known method without any specific limitations. Specific examples of application methods that can be used include doctor blading, dip coating, reverse roll coating, direct roll coating, gravure coating, extrusion coating, and brush coating. The thickness of the slurry coating on the current collector after application but before drying may be set as appropriate in accordance with the thickness of the electrode mixed material layer that is to be obtained through drying.

[Drying Step]

The slurry for an electrode mixed material layer on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry for an electrode mixed material layer on the current collector in this manner, an electrode mixed material layer can be formed on the current collector to thereby obtain an electrode for an electrochemical device that includes the current collector and the electrode mixed material layer.

After the drying step, the electrode mixed material layer may be further subjected to a pressing process, such as mold pressing or roll pressing. The pressing process can improve close adherence between the electrode mixed material layer and the current collector.

(Electrochemical Device)

A feature of the presently disclosed electrochemical device is that it includes the electrode for an electrochemical device set forth above. The presently disclosed electrochemical device may be a lithium ion secondary battery, an all-solid-state lithium ion secondary battery, an electric double-layer capacitor, or a lithium ion capacitor, for example, but is not specifically limited thereto, and is preferably a lithium ion secondary battery. As a result of the presently disclosed electrochemical device including the presently disclosed electrode for an electrochemical device, thermal runaway of the presently disclosed electrochemical device is inhibited, and the presently disclosed electrochemical device maintains a high level of safety.

Although the following describes, as one example, a case in which the electrochemical device is a lithium ion secondary battery, the presently disclosed electrochemical device is not limited to the following example. A lithium ion secondary battery corresponding to the presently disclosed electrochemical device normally includes electrodes (positive electrode and negative electrode), an electrolyte solution, and a separator, and has the presently disclosed electrode for an electrochemical device used as at least one of the positive electrode and the negative electrode.

<Electrodes>

Examples of electrodes other than the presently disclosed electrode for an electrochemical device set forth above that can be used in the lithium ion secondary battery corresponding to the presently disclosed electrochemical device include known electrodes without any specific limitations. Specifically, an electrode that is obtained by forming an electrode mixed material layer on a current collector by a known production method can be used as an electrode other than the electrode for an electrochemical device set forth above.

<Electrolyte Solution>

The electrolyte solution is normally an organic electrolyte solution obtained by dissolving a supporting electrolyte in an organic solvent. The supporting electrolyte may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. Note that one supporting electrolyte may be used individually, or two or more supporting electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used.

No specific limitations are placed on the organic solvent used in the electrolyte solution so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of these solvents may be used. Of these organic solvents, carbonates are preferable due to having a high permittivity and a wide stable potential region, and a mixture of ethylene carbonate and ethyl methyl carbonate is more preferable.

Note that the concentration of the supporting electrolyte in the electrolyte solution can be adjusted as appropriate and is, for example, preferably 0.5 mass % to 15 mass %, more preferably 2 mass % to 13 mass %, and even more preferably 5 mass % to 10 mass %. Moreover, a known additive such as fluoroethylene carbonate or ethyl methyl sulfone may be added to the electrolyte solution.

<Separator>

Examples of separators that can be used include, but are not specifically limited to, those described in JP2012-204303A. Of these separators, a microporous membrane made of polyolefinic (polyethylene, polypropylene, polybutene, or polyvinyl chloride) resin is preferred since such a membrane can reduce the total thickness of the separator, which increases the ratio of electrode active material in the lithium ion secondary battery, and consequently increases the volumetric capacity. Moreover, the separator may be a functional layer-equipped separator that includes a functional layer at one side or both sides of a separator substrate.

<<Functional Layer-Equipped Separator>>

A functional layer provided at one side or both sides of a separator substrate in a functional layer-equipped separator can function as a protective layer for improving heat resistance and strength of the separator. The functional layer can also optionally display a function of adhering the separator substrate and an electrode. The functional layer contains a binder and non-conductive particles, and optionally further contains other components.

[Binder]

The binder is a component that can hold components contained in the functional layer, such as the non-conductive particles, so that these components do not become detached from the functional layer. The previously described other polymer that functions as a binder can be used as the binder contained in the functional layer.

<Non-Conductive Particles>

The non-conductive particles are particles that maintain their shape in a dispersion medium of a composition for a non-aqueous secondary battery functional layer and in a non-aqueous electrolyte solution of a secondary battery without dissolving therein. The non-conductive particles are electrochemically stable and are, therefore, present stably in a functional layer in the environment of use of a secondary battery.

Various types of inorganic fine particles and organic fine particles can for example be used as the non-conductive particles.

Specifically, although both inorganic fine particles and organic fine particles other than the polymer used as the binder can be used as the non-conductive particles, inorganic fine particles are normally used. The material of the non-conductive particles is preferably an electrochemically stable material that is present stably in the environment of use of a non-aqueous secondary battery. Examples of non-conductive particles that are preferable from such a viewpoint include particles of oxides such as aluminum oxide (alumina), hydrous aluminum oxide (boehmite (AlOOH) and gibbsite ($Al(OH)_3$)), silicon oxide, magnesium oxide (magnesia), calcium oxide, titanium oxide (titania), barium titanate ($BaTiO_3$), ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, or the like as necessary. Of these examples, barium sulfate particles and alumina particles are preferable as the non-conductive particles.

Note that one of these types of non-conductive particles may be used individually, or two or more of these types of non-conductive particles may be used in combination.

<<Thickness of Functional Layer>>

The thickness of the functional layer is preferably not less than 0.2 μm and not more than 5 μm. A functional layer thickness of 0.2 μm or more can further increase protective function, and thus can further improve heat resistance and strength of a battery member that is provided with the functional layer. Moreover, a functional layer thickness of 5 μm or less enables a secondary battery to display excellent low-temperature output characteristics.

No specific limitations are placed on the method by which the functional layer is formed. For example, the functional layer can be formed by applying a composition for a functional layer that contains the above-described components onto a separator substrate or the like and then drying the applied composition for a functional layer by a commonly known method.

<Production Method of Lithium Ion Secondary Battery>

The lithium ion secondary battery in accordance with the present disclosure can be produced by, for example, stacking the positive electrode and the negative electrode with the separator in-between, performing rolling, folding, or the like of the resultant laminate as necessary in accordance with the battery shape to place the laminate in a battery container, injecting the electrolyte solution into the battery container, and sealing the battery container. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%", "ppm", and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

In the examples and comparative examples, the following methods were used for measurement or evaluation of specific surface area, initial thermal decomposition temperature, volume-average particle diameter, water content, viscosity, solid content concentration, slurry stability, electrode peel strength, rate characteristics, internal short circuit testing, and high-temperature storage characteristics.

<Specific Surface Area>

The surface area of each conductive additive used in the examples and comparative examples was measured using a flow-type specific surface area meter (FlowSorb III 2305 produced by Shimadzu Corporation). The obtained surface area was divided by the weight of the conductive additive to measure the specific surface area (BET specific surface area) of the conductive additive.

<Initial Thermal Decomposition Temperature>

In thermogravimetric analysis using a thermogravimetric analyzer (TG8110 produced by Rigaku Corporation), the mass of expandable particles was measured while heating the expandable particles from 25° C. to 500° C. at a heating rate of 20° C./min in an air atmosphere, and the temperature at which the measured mass reached 95% of the mass at the start of measurement (25° C.) (i.e., the 5% mass loss temperature) was taken to be the initial thermal decomposition temperature of the expandable particles.

<Volume-Average Particle Diameter>

The volume-average particle diameter (D50) of expandable particles was measured using a laser diffraction particle size distribution analyzer (SALD-7100 produced by Shimadzu Corporation).

<Water Content>

After weighing 0.2 g of a conductive paste into a sample bottle, the amount of water in the conductive paste was measured by the Karl Fischer method (water vaporization method of JIS K-0068(2001); vaporization temperature: 250° C.) using a coulometric titration water meter, and this amount was taken to be the water content of the conductive paste.

<Viscosity>

The viscosity of a conductive paste was measured under conditions of 25° C. and 6 rpm using a B-type viscometer (DVE produced by EKO Instruments Co., Ltd.).

<Solid Content Concentration>

The solid content concentration of a conductive paste was calculated based on the following formula.

Solid content concentration of conductive paste (%)=[Mass of all solid content (total mass of conductive additive,polymer, and expandable particles)/Mass of all solid content and solvent]×100

<Slurry Stability>

A slurry for an electrode mixed material layer produced in each example or comparative example was loaded into a plastic vessel (circular shape of 3 cm in diameter and 5 cm in height), was sealed inside the vessel, and was left at rest at room temperature of 25±2° C. Sedimentation of electrode active material and gelation (lack of fluidity of the slurry) were inspected visually and by touch. An evaluation was made by the following standard. The evaluation results are shown in Table 1.

Less sedimentation and gelation indicate better slurry stability.

<<Evaluation Standard>>

A: No sedimentation or gelation after 7 days

B: Sedimentation or gelation after 5 days

C: Sedimentation or gelation after 3 days

D: Sedimentation or gelation after 1 day

<Electrode Peel Strength>

A positive electrode for a lithium ion secondary battery produced in each example or comparative example was cut out with a rectangular shape of 100 mm in length and 10 mm in width to obtain a test specimen. The test specimen was placed with the surface at which an electrode mixed material layer was located facing downward, and the surface at the electrode mixed material layer side of the test specimen was affixed to a test stage (base plate made from SUS) through cellophane tape (tape in accordance with JIS Z1522). Thereafter, the stress (N/m) was measured when the current collector was peeled off by pulling one end of the current collector in a perpendicular direction at a pulling speed of 50 mm/min (note that the cellophane tape was secured to the test stage).

Three measurements were performed in this manner, an average value thereof was determined, and the average value was taken to be the electrode peel strength and was evaluated by the following standard. The evaluation results are shown in Table 1.

A larger value for the electrode peel strength indicates better close adherence of the electrode mixed material layer and the current collector.

<<Evaluation Standard>>

A: Electrode peel strength of 5 N/m or more

B: Electrode peel strength of not less than 3 N/m and less than 5 N/m

C: Electrode peel strength of not less than 2 N/m and less than 3 N/m

D: Electrode peel strength of less than 2 N/m

<Rate Characteristics>

A lithium ion secondary battery produced in each example or comparative example was left at rest at a temperature of 25° C. for 5 hours after injection of electrolyte solution. Next, the lithium ion secondary battery was charged to a cell voltage of 3.65 V by a 0.2 C constant current method at a temperature of 25° C. and was then subjected to 12 hours of aging at a temperature of 60° C. The lithium ion secondary battery was subsequently discharged to a cell voltage of 3.00 V by a 0.2 C constant current method at a temperature of 25° C. Thereafter, CC-CV charging of the lithium ion secondary battery was performed with a 0.2 C constant current (upper limit cell voltage: 4.20 V) and CC discharging of the lithium ion secondary battery was performed to a cell voltage of 3.00 V with a 0.2 C constant current. This charging and discharging at 0.2 C was repeated three times.

Next, the lithium ion secondary battery was subjected to 0.2 C constant current charging and discharging between cell voltages of 4.20 V and 3.00 V in an environment having a temperature of 25° C., and the discharge capacity at this time was defined as CO. Thereafter, the lithium ion secondary battery was CC-CV charged with a 0.2 C constant current in the same manner, was then discharged to 3.0 V with a 2.0 C constant current in an environment having a temperature of 25° C., and the discharge capacity at this time was defined as C1. A capacity change rate expressed by ΔC=(C1/C0)×100(%) was determined as a rate characteristic and was evaluated by the following standard. The evaluation results are shown in Table 1. A larger value for the capacity change rate ΔC indicates higher discharge capacity, lower internal resistance, and better rate characteristics.

<<Evaluation Standard>>

A: Capacity change rate ΔC of 75% or more

B: Capacity change rate ΔC of not less than 73% and less than 75%

C: Capacity change rate ΔC of not less than 70% and less than 73%

D: Capacity change rate ΔC of less than 70%

<Internal Short Circuit Testing (Testing of Joule Heat Release Upon Internal Short Circuiting of Lithium Ion Secondary Battery)>

A subsequently described functional layer-equipped separator (substrate material: polypropylene; functional layer thickness: 4 μm; separator having 1 mm square hole opened therein) was sandwiched between a positive electrode and a negative electrode (each equipped with a tab), and these members were sealed using an aluminum pouch to produce a cell. An internal short circuit part was intentionally created by applying 10 N of force through a cylinder (SUS: Steel Use Stainless) of 8 mm in diameter to the part where a hole was opened in the functional layer-equipped separator of the cell. A DC regulated power supply (PWR1201L produced by Kikusui Electronics Corp.) was used to apply 10 V with respect to the positive electrode tab and the negative electrode tab of the cell, and the current and the voltage during this application were monitored. The resistance was calculated from the current and the voltage, and the time taken for the resistance to increase by a factor of 100 from straight after application of the voltage of 10 V was measured. An evaluation was made by the following standard. The evaluation results are shown in Table 1.

<<Evaluation Standard>>

A: Less than 5 s

B: Not less than 5 s and less than 10 s

C: Not less than 10 s and less than 15 s

D: 15 s or more

<High-Temperature Storage Characteristics (Capacity Maintenance Rate)>

A lithium ion secondary battery produced in each example or comparative example was left at rest at a temperature of 25° C. for 5 hours after injection of electrolyte solution. Next, the lithium ion secondary battery was charged to a cell voltage of 3.65 V by a 0.2 C constant current method at a temperature of 25° C. and was then subjected to 12 hours of aging at a temperature of 60° C. The lithium ion secondary battery was subsequently discharged to a cell voltage of 3.00 V by a 0.2 C constant current method at a temperature of 25° C. Thereafter, CC-CV charging of the lithium ion secondary battery was performed by a 0.2 C constant current method (upper limit cell voltage: 4.20 V), and CC discharging of the lithium ion secondary battery was performed by a 0.2 C constant current method. This charging and discharging at 0.2 C was repeated three times. The discharge capacity obtained during the final charge and discharge was taken to be X1.

Thereafter, the lithium ion secondary battery was charged to a cell voltage of 4.20 V at 25° C. and was then left at rest in that state in an environment having a temperature of 60° C. for 2 weeks. The lithium ion secondary battery was subsequently discharged to a cell voltage of 3.00 V by a 0.2 C constant current method at a temperature of 25° C. This discharge capacity was taken to be X2.

A capacity change rate expressed by ΔC=(X2/X1)×100 (%) was determined from the discharge capacity X1 and the discharge capacity X2 and was evaluated by the following standard. A larger value for the capacity change rate ΔC indicates better high-temperature storage characteristics (capacity maintenance rate).

<<Evaluation Standard>>

A: ΔC of 85% or more

B: ΔC of not less than 83% and less than 85%

C: ΔC of not less than 80% and less than 83%

D: ΔC of less than 80%

Production Example 1: Production of Polymer A (Nitrile Group-Containing Polymer)

An autoclave equipped with a stirrer was charged with 240 parts of deionized water, 2.5 parts of sodium alkylbenzene sulfonate as an emulsifier, 34.0 parts of acrylonitrile as a nitrile group-containing monomer, 2.2 parts of methacrylic acid as a carboxyl group-containing monomer, and 0.45 parts of t-dodecyl mercaptan as a chain transfer agent in this order and was internally purged with nitrogen. Thereafter, 63.8 parts of 1,3-butadiene as a conjugated diene monomer for introducing an alkylene structural unit into a polymer was injected, 0.25 parts of ammonium persulfate as a polymerization initiator was added, and a polymerization reaction was carried out at a reaction temperature of 40° C. This yielded a copolymer of acrylonitrile and 1,3-butadiene. Note that the polymerization conversion rate was 85%.

Deionized water was added to the resultant copolymer to obtain a solution adjusted to a total solid content concentration of 12 mass %. After loading 400 mL (all solid content: 48 g) of the obtained solution into a stirrer-equipped autoclave having a capacity of 1 L and passing nitrogen gas for 10 minutes in order to remove dissolved oxygen in the solution, 75 mg of palladium acetate as a hydrogenation reaction catalyst was dissolved in 180 mL of deionized water to which nitric acid had been added in amount of 4 molar equivalents relative to the palladium (Pd), and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (first stage hydrogenation reaction) was performed for 6 hours.

Next, the autoclave was restored to atmospheric pressure. In addition, 25 mg of palladium acetate as a hydrogenation reaction catalyst was dissolved in 60 mL of deionized water to which nitric acid had been added in an amount of 4 molar equivalents relative to the Pd, and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (second stage hydrogenation reaction) was performed for 6 hours.

Next, the contents of the autoclave were restored to normal temperature and the system was converted to a nitrogen atmosphere. Thereafter, the contents were concentrated to a solid content concentration of 40% using an evaporator to yield a water dispersion of a polymer.

The obtained water dispersion of the polymer was dripped into methanol to cause coagulation, and the coagulated material was vacuum dried at a temperature of 60° C. for 12 hours to obtain a polymer A including nitrile group-containing monomer units (acrylonitrile units) and alkylene structural units (hydrogenated 1,3-butadiene units).

Production Example 2: Production of Polymer B (Amide Group-Containing Polymer)

Special Grade Reagent Polyvinylpyrrolidone K30 produced by Wako Pure Chemical Industries, Ltd. was used as a polymer B.

Production Example 3: Production of Polymer C (Ester Group-Containing Polymer)

Special Grade Reagent Polyvinyl Butyral produced by Wako Pure Chemical Industries, Ltd. was used as a polymer C.

Production Example 4: Production of Polymer D (Nitrile Group-Containing Polymer)

A reactor A to which a mechanical stirrer and a condenser had been attached was charged with 85 parts of deionized water and 0.2 parts of sodium dodecylbenzenesulfonate under a nitrogen atmosphere. These materials were subsequently heated to 55° C. under stirring, and 0.3 parts of potassium persulfate was added into the reactor A in the form of a 5.0% aqueous solution. Next, a separate vessel B to which a mechanical stirrer had been attached was charged with 94.0 parts of acrylonitrile as a nitrile group-containing monomer, 1.0 parts of acrylamide as an amide group-containing monomer, 2.0 parts of acrylic acid as a carboxyl group-containing monomer, 3.0 parts of n-butyl acrylate as a (meth)acrylic acid ester monomer, 0.6 parts of sodium dodecylbenzenesulfonate, 0.035 parts of t-dodecyl mercaptan as a chain transfer agent, 0.4 parts of polyoxyethylene lauryl ether, and 80 parts of deionized water under a nitrogen atmosphere, and these materials were stirred and emulsified to produce a monomer mixture. The monomer mixture was added into the reactor A at a constant rate over 5 hours while in a stirred and emulsified state, and a reaction was carried out until the polymerization conversion rate reached 95% to yield a water dispersion of a polyacrylonitrile (PAN) copolymer including mainly acrylonitrile units (94 mass %). The obtained water dispersion of the polymer was dripped into methanol to cause coagulation, and the coagulated material was vacuum dried at a temperature of 60° C. for 12 hours to obtain a polymer D. In addition, an appropriate amount of NMP was added to a portion of the obtained water dispersion of the PAN copolymer to obtain a mixture. Thereafter, water and excess NMP were removed from the mixture by performing vacuum distillation at 90° C. to obtain an NMP solution (solid content concentration: 8%) of the PAN copolymer. The viscosity of the NMP solution at a shear rate of 10 $s^{-1}$ was 5,750 mPa·s.

Production Example 5: Production of Polymer E (Nitrile Group-Containing Polymer)

An autoclave equipped with a stirrer was charged with 240 parts of deionized water, 2.5 parts of sodium alkylbenzene sulfonate as an emulsifier, 20 parts of acrylonitrile as a nitrile group-containing monomer, 10 parts of styrene as an aromatic vinyl monomer, and 5 parts of methacrylic acid as a carboxyl group-containing monomer in this order, and the inside of a bottle was purged with nitrogen. Thereafter, 65 parts of 1,3-butadiene as a conjugated diene monomer was injected, 0.25 parts of ammonium persulfate as a polymerization initiator was added, and a polymerization reaction was carried out at a reaction temperature of 40° C. This yielded a polymer including nitrile group-containing monomer units, aromatic vinyl monomer units, carboxyl group-containing monomer units, and polymerization units formable by a conjugated diene monomer. The polymerization conversion rate was 85% and the iodine value was 280 mg/100 mg.

Deionized water was added to the obtained polymer to obtain a solution that was adjusted to a total solid content concentration of 12 mass %. After loading 400 mL (all solid content: 48 g) of the obtained solution into a stirrer-equipped autoclave having a capacity of 1 L and passing nitrogen gas for 10 minutes in order to remove dissolved oxygen in the solution, 75 mg of palladium acetate as a hydrogenation reaction catalyst was dissolved in 180 mL of deionized water to which nitric acid had been added in amount of 4 molar equivalents relative to the Pd, and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (first stage hydrogenation reaction) was performed for 6 hours. The iodine value of the polymer at this point was 45 mg/100 mg.

Next, the autoclave was restored to atmospheric pressure. In addition, 25 mg of palladium acetate as a hydrogenation reaction catalyst was dissolved in 60 mL of water to which nitric acid had been added in an amount of 4 molar equivalents relative to the Pd, and the resultant solution was added into the autoclave. The system was purged twice with hydrogen gas, and then the contents of the autoclave were heated to 50° C. in a state in which the pressure was increased to 3 MPa with hydrogen gas, and a hydrogenation reaction (second stage hydrogenation reaction) was performed for 6 hours.

The obtained water dispersion of a polymer was dripped into methanol to cause coagulation, and the coagulated material was vacuum dried at a temperature of 60° C. for 12 hours to obtain a polymer E including aromatic vinyl monomer units, nitrile group-containing monomer units (acrylonitrile units), and alkylene structural units (hydrogenated 1,3-butadiene units).

Production Example 6: Production of Expandable Particles A (Melamine Pulverized/Purified Product)

After adding 200 g of melamine into 1 L of distilled water, mixing and stirring were performed at room temperature for 2 hours using a Three-One Motor (BL300 produced by SHINTO Scientific Co., Ltd.). Thereafter, separation by filtration and washing were performed on a wire mesh. These operations were performed twice.

In addition, the washed material was washed twice in the same manner using 1 L of ethanol to perform purification.

Next, 175 g of the purified melamine and 236 g of NMP were weighed out, and a preliminary dispersion liquid was produced using a Three-One Motor (BL300 produced by SHINTO Scientific Co., Ltd.).

A bead mill (LMZ-015 produced by Ashizawa Finetech Ltd.) was used to process 500 g of the produced preliminary dispersion liquid for 10 minutes with a bead diameter of 0.5 mm, a bead filling rate of 80%, and a circumferential speed of 12 m/s to obtain expandable particles A. The initial thermal decomposition temperature and volume-average particle diameter of the expandable particles A were measured. The results are shown in Table 1.

Production Example 7: Production of Expandable Particles B (Melamine Cyanurate Pulverized/Purified Product)

Expandable particles B were obtained by performing the same operations as in Production Example 6 with the exception that melamine was changed to melamine cyanurate in Production Example 6. The initial thermal decomposition temperature and volume-average particle diameter of the expandable particles B were measured. The results are shown in Table 1.

Production Example 8: Production of Expandable Particles C (Oxybis(Benzenesulfonyl Hydrazide) Pulverized/Purified Product)

Expandable particles C were obtained by performing the same operations as in Production Example 6 with the exception that melamine was changed to oxybis(benzenesulfonyl hydrazide) in Production Example 6. The initial thermal decomposition temperature and volume-average particle diameter of the expandable particles C were measured. The results are shown in Table 1.

Production Example 9: Production of Expandable Particles D (Melamine Pulverized/Purified Product)

Expandable particles D were obtained by performing the same operations as in Production Example 6 with the exception that the bead diameter was changed to 1.0 mm in Production Example 6. The initial thermal decomposition temperature and volume-average particle diameter of the expandable particles D were measured. The results are shown in Table 1.

Production Example 10: Production of Expandable Particles E (Oxybis(Benzenesulfonyl Hydrazide) Pulverized/Purified Product)

Expandable particles E were obtained by performing the same operations as in Production Example 8 with the exception that the bead diameter was changed to 0.3 mm in Production Example 8. The initial thermal decomposition temperature and volume-average particle diameter of the expandable particles E were measured. The results are shown in Table 1.

Example 1

<Production of Conductive Paste>

A conductive paste was produced by adding 100 parts of acetylene black (BET specific surface area: 68 $m^2/g$) as a conductive additive, 50 parts of the polymer A (nitrile group-containing polymer) obtained as described above, 50 parts of the expandable particles A (initial thermal decomposition temperature: 200° C.; volume-average particle diameter: 0.15 μm) obtained as described above, and an appropriate amount of NMP as an organic solvent inside a dry room having a dew point of −40° C., stirring these materials using a disper blade (3,000 rpm, 60 minutes), and then mixing these materials at a circumferential speed of 8 m/s for 1 hour using a bead mill in which zirconia beads of 0.3 mm in diameter were used. Note that the conductive paste had a solid content concentration of 15.0 mass % and a water content of 300 ppm.

<Production of Slurry for Electrode Mixed Material Layer>

A planetary mixer was used to mix 100 parts of an active material NMC532 based on a lithium-containing complex oxide of Co—Ni—Mn ($LiNi_{0.5}Mn_{0.3}Co_{0.2}O_2$) as a positive electrode active material, 25 parts of the conductive paste produced as described above, and 2.0 parts in terms of solid content of polyvinylidene fluoride (PVdF; produced by Kureha Corporation; product name: L #7208) as another polymer, NMP was gradually added as an organic solvent (dispersion medium), and stirring and mixing were performed at a temperature of 25±3° C. and a rotation speed of 60 rpm to obtain a slurry for an electrode mixed material layer having a viscosity of 3,600 mPa·s as measured at 60 rpm (M4 rotor) and 25±3° C. using a B-type viscometer. The slurry stability of the obtained slurry for an electrode mixed material layer was evaluated by the previously described method. The result is shown in Table 1.

<Production of Positive Electrode>

The slurry for an electrode mixed material layer obtained as described above was applied onto aluminum foil of 20 μm in thickness serving as a current collector using a comma coater such as to have a coating weight of 20±0.5 $mg/cm^2$.

The slurry for an electrode mixed material layer on the aluminum foil was dried by conveying the aluminum foil inside an oven having a temperature of 90° C. for 2 minutes and an oven having a temperature of 120° C. for 2 minutes at a speed of 200 mm/min so as to obtain a positive electrode web including an electrode mixed material layer formed on the current collector.

Thereafter, the electrode mixed material layer side of the produced positive electrode web was roll pressed with a line pressure of 14 t (tons) in an environment having a temperature of 25±3° C. to obtain a positive electrode having an electrode mixed material layer density of 3.20 $g/cm^3$. The obtained positive electrode was used to evaluate electrode peel strength by the previously described method. The result is shown in Table 1.

<Production of Binder Composition for Negative Electrode>

A 5 MPa pressure-resistant vessel equipped with a stirrer was charged with 65 parts of styrene as an aromatic vinyl monomer, 35 parts of 1,3-butadiene as an aliphatic conjugated diene monomer, 2 parts of itaconic acid as a carboxyl group-containing monomer, 1 part of 2-hydroxyethyl acrylate as a hydroxyl group-containing monomer, 0.3 parts of t-dodecyl mercaptan as a molecular weight modifier, 5 parts of sodium dodecylbenzenesulfonate as an emulsifier, 150 parts of deionized water as a solvent, and 1 part of potassium persulfate as a polymerization initiator. These materials were sufficiently stirred and were then heated to a temperature of 55° C. to initiate polymerization. The reaction was quenched by cooling at the point at which monomer consumption reached 95.0%. A water dispersion containing a polymer that was obtained in this manner was then adjusted to a pH of 8 through addition of 5% sodium hydroxide aqueous solution. Unreacted monomer was subsequently removed through thermal-vacuum distillation. Thereafter, cooling was performed to a temperature of 30° C. or lower to obtain a water dispersion containing a binder for a negative electrode (binder composition for negative electrode).

<Production of Slurry Composition for Negative Electrode>

A planetary mixer was charged with 48.75 parts of artificial graphite (theoretical capacity: 360 mAh/g) and 48.75 g of natural graphite (theoretical capacity: 360 mAh/g) as negative electrode active materials, and 1 part in terms of solid content of carboxymethyl cellulose as a thickener. These materials were diluted to a solid content concentration of 60% with deionized water and were subsequently kneaded at a rotation speed of 45 rpm for 60 minutes. Thereafter, 1.5 parts in terms of solid content of the binder composition for a negative electrode obtained as described above was added and was kneaded therewith at a rotation speed of 40 rpm for 40 minutes. Next, deionized water was added to adjust the viscosity to 3,000±500 mPa·s (measured at 25° C. and 60 rpm by B-type viscometer) and thereby produce a slurry composition for a negative electrode.

<Production of Negative Electrode>

The slurry composition for a negative electrode was applied onto the surface of copper foil of 15 μm in thickness serving as a current collector using a comma coater such as to have a coating weight of 11±0.5 mg/$cm^2$. The copper foil that had been coated with the slurry composition for a negative electrode was subsequently conveyed inside an oven having a temperature of 80° C. for 2 minutes and inside an oven having a temperature of 110° C. for 2 minutes at a speed of 400 mm/min so as to dry the slurry composition for a negative electrode on the copper foil and thereby obtain a negative electrode web including a negative electrode mixed material layer formed on the current collector.

Thereafter, the negative electrode mixed material layer side of the produced negative electrode web was roll pressed with a line pressure of 11 t (tons) in an environment having a temperature of 25±3° C. to obtain a negative electrode having a negative electrode mixed material layer density of 1.60 g/$cm^3$.

<Preparation of Separator Substrate for Secondary Battery>

A separator made from a single layer of polypropylene (produced by Celgard, LLC.; product name: #2500) was prepared as a separator substrate.

<Production of Composition for Functional Layer>

A composition for a functional layer was produced by mixing 6.0 parts in terms of solid content of an acrylic polymer as a binder, 1.5 parts in terms of solid content of an acrylamide polymer into which a carboxyl group had been introduced (POLYSTRON® 117 (POLYSTRON is a registered trademark in Japan, other countries, or both) produced by Arakawa Chemical Industries, Ltd.) as a thickener, and 0.2 parts in terms of solid content of a polyethylene glycol surfactant (SAN NOPCO® SN WET 366 (SAN NOPCO is a registered trademark in Japan, other countries, or both) produced by San Nopco Limited) with 100 parts of alumina filler (LS256 produced by Nippon Light Metal Co., Ltd.) as non-conductive particles.

<Production of Functional Layer-Equipped Separator>

The composition for a functional layer obtained as described above was applied onto one side of the separator substrate described above using a wire bar and was dried at 60° C. for 10 minutes. In this manner, a functional layer-equipped separator having a functional layer thickness of 4 μm was obtained.

<Production of Lithium Ion Secondary Battery>

The positive electrode, the negative electrode, and the separator made of a single layer of polypropylene serving as the previously described separator substrate for a secondary battery were used to produce a single-layer laminate cell (initial design discharge capacity equivalent to 30 mAh) and were arranged inside aluminum packing. The aluminum packing was subsequently filled with $LiPF_6$ solution of 1.0 M in concentration (solvent: mixed solvent of ethylene carbonate (EC)/diethyl carbonate (DEC)=5/5 (volume ratio); additive: containing 2 volume % (solvent ratio) of vinylene carbonate) as an electrolyte solution. The aluminum packing was then closed by heat sealing at a temperature of 150° C. to tightly seal an opening of the aluminum packing, and thereby produce a lithium ion secondary battery. The obtained lithium ion secondary battery was used to perform evaluation of rate characteristics, internal short circuit testing, and high-temperature storage characteristics (capacity maintenance rate). The results are shown in Table 1.

Example 2

A conductive paste, a slurry for an electrode mixed material layer, a positive electrode, a negative electrode, and a lithium ion secondary battery were produced in the same way as in Example 1 with the exception that the expandable particles B were used instead of the expandable particles A. Measurements and evaluations were also performed in the same manner as in Example 1. The results are shown in Table 1.

Example 3

A conductive paste, a slurry for an electrode mixed material layer, a positive electrode, a negative electrode, and a lithium ion secondary battery were produced in the same way as in Example 1 with the exception that the expandable particles C were used instead of the expandable particles A. Evaluations were also performed in the same manner as in Example 1. The results are shown in Table 1.

Example 4

A conductive paste, a slurry for an electrode mixed material layer, a positive electrode, a negative electrode, and a lithium ion secondary battery were produced in the same way as in Example 1 with the exception that the expandable particles D were used instead of the expandable particles A. Measurements and evaluations were also performed in the same manner as in Example 1. The results are shown in Table 1.

Example 5

A conductive paste, a slurry for an electrode mixed material layer, a positive electrode, a negative electrode, a separator, and a lithium ion secondary battery were produced in the same way as in Example 1 with the exception that the polymer B was used instead of the polymer A, and the expandable particles E were used instead of the expandable particles A. Measurements and evaluations were also performed in the same manner as in Example 1. The results are shown in Table 1.

Example 6

A conductive paste, a slurry for an electrode mixed material layer, a positive electrode, a negative electrode, and a lithium ion secondary battery were produced in the same way as in Example 5 with the exception that the polymer B was changed to the polymer C. Measurements and evaluations were also performed in the same manner as in Example 1. The results are shown in Table 1.

Example 7

A conductive paste, a slurry for an electrode mixed material layer, a positive electrode, a negative electrode, and a lithium ion secondary battery were produced in the same way as in Example 1 with the exception that the amount of the polymer A was changed to 15 parts. Measurements and evaluations were also performed in the same manner as in Example 1. The results are shown in Table 1.

Example 8

A conductive paste, a slurry for an electrode mixed material layer, a positive electrode, a negative electrode, and a lithium ion secondary battery were produced in the same way as in Example 7 with the exception that the amount of the expandable particles A was changed to 25 parts. Measurements and evaluations were also performed in the same manner as in Example 7. The results are shown in Table 1.

Example 9

A conductive paste, a slurry for an electrode mixed material layer, a positive electrode, a negative electrode, and a lithium ion secondary battery were produced in the same way as in Example 1 with the exception that the amount of the polymer A was changed to 5 parts, and the amount of the expandable particles A was changed to 15 parts. Measurements and evaluations were also performed in the same manner as in Example 1. The results are shown in Table 1.

Example 10

A conductive paste, a slurry for an electrode mixed material layer, a positive electrode, a negative electrode, and a lithium ion secondary battery were produced in the same way as in Example 1 with the exception that the polymer A was changed to 100 parts of the polymer D, and the amount of the expandable particles A was changed to 100 parts. Measurements and evaluations were also performed in the same manner as in Example 1. The results are shown in Table 1.

Example 11

A conductive paste, a slurry for an electrode mixed material layer, a positive electrode, a negative electrode, and a lithium ion secondary battery were produced in the same way as in Example 10 with the exception that the amount of the polymer D was changed to 30 parts. Measurements and evaluations were also performed in the same manner as in Example 10. The results are shown in Table 1.

Example 12

A conductive paste, a slurry for an electrode mixed material layer, a positive electrode, a negative electrode, and a lithium ion secondary battery were produced in the same way as in Example 1 with the exception that acetylene black was changed to carbon nanotubes (CNTs), the polymer A was changed to 180 parts of the polymer E, and the amount of the expandable particles A was changed to 200 parts. Measurements and evaluations were also performed in the same manner as in Example 1. The results are shown in Table 1.

Example 13

A conductive paste, a slurry for an electrode mixed material layer, a positive electrode, a negative electrode, and a lithium ion secondary battery were produced in the same way as in Example 12 with the exception that the amount of the polymer E was changed to 60 parts. Measurements and evaluations were also performed in the same manner as in Example 12. The results are shown in Table 1.

Example 14

A conductive paste, a slurry for an electrode mixed material layer, a positive electrode, a negative electrode, and a lithium ion secondary battery were produced in the same way as in Example 12 with the exception that the amount of the polymer E was changed to 60 parts, and the amount of the expandable particles A was changed to 100 parts. Measurements and evaluations were also performed in the same manner as in Example 12. The results are shown in Table 1.

Example 15

A conductive paste, a slurry for an electrode mixed material layer, a positive electrode, a negative electrode, and a lithium ion secondary battery were produced in the same way as in Example 12 with the exception that the amount of the polymer E was changed to 167 parts, and the amount of the expandable particles A was changed to 333 parts. Measurements and evaluations were also performed in the same manner as in Example 12. The results are shown in Table 1.

Example 16

A conductive paste, a slurry for an electrode mixed material layer, a positive electrode, a negative electrode, and a lithium ion secondary battery were produced in the same way as in Example 12 with the exception that the amount of the polymer E was changed to 5 parts, and the amount of the expandable particles A was changed to 15 parts. Measurements and evaluations were also performed in the same manner as in Example 12. The results are shown in Table 1.

Example 17

A conductive paste, a slurry for an electrode mixed material layer, a positive electrode, a negative electrode, and a lithium ion secondary battery were produced in the same way as in Example 1 with the exception that the dew point in the conductive paste production environment was changed to −30° C. Measurements and evaluations were also performed in the same manner as in Example 1. The results are shown in Table 1.

Example 18

A conductive paste, a slurry for an electrode mixed material layer, a positive electrode, a negative electrode, and a lithium ion secondary battery were produced in the same way as in Example 1 with the exception that the dew point in the conductive paste production environment was changed to −25° C. Measurements and evaluations were also performed in the same manner as in Example 1. The results are shown in Table 1.

Comparative Examples 1 to 4

A conductive paste, a slurry for an electrode mixed material layer, a positive electrode, a negative electrode, and a lithium ion secondary battery were produced in the same way as in Example 1 with the exception that the amount of the polymer A and the amount of the expandable particles A were changed to amounts shown in Table 2. Measurements and evaluations were also performed in the same manner as in Example 1. The results are shown in Table 2.

Comparative Example 5

A slurry for an electrode mixed material layer was obtained by directly mixing 1.88 parts of acetylene black, 100 parts of NMC, and 2 parts of PVdF used in Example 1 without producing a conductive paste. With the exception of this point, a positive electrode, a negative electrode, and a lithium ion secondary battery were produced in the same way as in Example 1. Measurements and evaluations were also performed in the same manner as in Example 1. The results are shown in Table 2.

Comparative Example 6

A conductive paste, a slurry for an electrode mixed material layer, a positive electrode, a negative electrode, and a lithium ion secondary battery were produced in the same way as in Example 1 with the exception that a polymer F (polyvinylidene fluoride as polymer not including prescribed functional group; L #7200 produced by Kureha Corporation) was used instead of the polymer A. Measurements and evaluations were also performed in the same manner as in Example 1. The results are shown in Table 2.

Comparative Example 7

A conductive paste, a slurry for an electrode mixed material layer, a positive electrode, a negative electrode, and a lithium ion secondary battery were produced in the same way as in Example 1 with the exception that the dew point in the conductive paste production environment was changed to −20° C. Measurements and evaluations were also performed in the same manner as in Example 1. The results are shown in Table 2.

Comparative Example 8

A conductive paste, a slurry for an electrode mixed material layer, a positive electrode, a negative electrode, and a lithium ion secondary battery were produced in the same way as in Example 1 with the exception that the expandable particles A were not used, and the dew point in the conductive paste production environment was changed to −20° C. Measurements and evaluations were also performed in the same manner as in Example 1. The results are shown in Table 2.

TABLE 1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Slurry for electrode mixed material layer | Conductive paste for electrode mixed material layer | (A) Conductive additive | Type | AB | AB | AB | AB | AB | AB | AB | AB | AB |
| | | | Amount [parts by mass] | 100 | 100 | 100 | 100 | 100 | 100 | 100 | 100 | 100 |
| | | | Specific surface area [$m^2/g$] | 68 | 68 | 68 | 68 | 68 | 68 | 68 | 68 | 68 |
| | | (B) Polymer | Type of functional group | Nitrile group | Nitrile group | Nitrile group | Nitrile group | Amide group | Ester group | Nitrile group | Nitrile group | Nitrile group |
| | | | Type of polymer | Polymer A | Polymer A | Polymer A | Polymer A | Polymer B | Polymer C | Polymer A | Polymer A | Polymer A |
| | | | Amount [parts by mass] | 50 | 50 | 50 | 50 | 50 | 50 | 15 | 15 | 5 |
| | | (C) Expandable particles | Type | Expandable particles A | Expandable particles B | Expandable particles C | Expandable particles D | Expandable particles E | Expandable particles E | Expandable particles A | Expandable particles A | Expandable particles A |
| | | | Initial thermal decomposition temperature [° C.] | 200 | 250 | 160 | 200 | 160 | 160 | 200 | 200 | 200 |
| | | | Amount [parts by mass] | 50 | 50 | 50 | 50 | 50 | 50 | 50 | 25 | 15 |
| | | | Volume-average particle diameter [μm] | 0.15 | 0.15 | 0.20 | 2.00 | 0.15 | 0.15 | 0.15 | 0.15 | 0.15 |
| | | Water content [ppm] | | 300 | 300 | 300 | 300 | 300 | 300 | 300 | 300 | 300 |
| | | Viscosity [mPa · s] | | 3,000 | 4,500 | 6,000 | 500 | 7,800 | 8,500 | 5,500 | 4,000 | 4,000 |
| | | Solid content concentration [mass %] solid content of (A)-(C) | | 15 | 15 | 15 | 15 | 15 | 15 | 15 | 15 | 15 |
| | Electrode active material | | Type | NMC | NMC | NMC | NMC | NMC | NMC | NMC | NMC | NMC |
| | | | Amount [parts by mass] | 100 | 100 | 100 | 100 | 100 | 100 | 100 | 100 | 100 |
| | Other polymer | | Type | PVdF | PVdF | PVdF | PVdF | PVdF | PVdF | PVdF | PVdF | PVdF |
| | | | Amount [parts by mass] | 2 | 2 | 2 | 2 | 2 | 2 | 2 | 2 | 2 |
| | Conductive paste | | Amount [parts by mass] | 25 | 25 | 25 | 25 | 25 | 25 | 25 | 25 | 25 |
| | Conductive paste production enviroment | | Dew point [° C.] | −40 | −40 | −40 | −40 | −40 | −40 | −40 | −40 | −40 |
| | Evaluation | | Slurry stability | A | A | B | B | A | B | B | A | B |
| | | | Electrode peel strength | A | A | A | A | B | B | B | B | B |
| | | | Rate characteristics | A | A | B | B | B | B | A | A | A |
| | | | Internal short circuit testing | A | B | A | A | B | B | A | B | B |
| | | | High-temperature storage characteristics (capacity maintenance rate) | A | A | B | B | B | B | A | A | B |

TABLE 1-continued

| | | | | Example 10 | Example 11 | Example 12 | Example 13 | Example 14 | Example 15 | Example 16 | Example 17 | Example 18 |
|---|---|---|---|---|---|---|---|---|---|---|---|---|
| Slurry for electrode mixed material layer | Conductive paste for electrode mixed material layer | (A) Conductive additive | Type | AB | AB | CNT | CNT | CNT | CNT | CNT | AB | AB |
| | | | Amount [parts by mass] | 100 | 100 | 100 | 100 | 100 | 100 | 100 | 100 | 100 |
| | | | Specific surface area [$m^2/g$] | 68 | 68 | 130 | 130 | 130 | 130 | 130 | 68 | 68 |
| | | (B) Polymer | Type of functional group | Nitrile group | Nitrile group | Nitrile group | Nitrile group | Nitrile group | Nitrile group | Nitrile group | Nitrile group | Nitrile group |
| | | | Type of polymer | Polymer D | Polymer D | Polymer E | Polymer E | Polymer E | Polymer E | Polymer E | Polymer A | Polymer A |
| | | | Amount [parts by mass] | 100 | 30 | 180 | 60 | 60 | 167 | 5 | 50 | 50 |
| | | (C) Expandable particles | Type | Expandable particles A | Expandable particles A | Expandable particles A | Expandable particles A | Expandable particles A | Expandable particles A | Expandable particles A | Expandable particles A | Expandable particles A |
| | | | Initial thermal decomposition temperature [° C.] | 200 | 200 | 200 | 200 | 200 | 200 | 200 | 200 | 200 |
| | | | Amount [parts by mass] | 100 | 100 | 200 | 200 | 100 | 333 | 15 | 50 | 50 |
| | | | Volume-average particle diameter [μm] | 0.15 | 0.15 | 0.15 | 0.15 | 0.15 | 0.15 | 0.15 | 0.15 | 0.15 |
| | | Water content [ppm] | | 300 | 300 | 300 | 300 | 300 | 300 | 300 | 450 | 920 |
| | | Viscosity [mPa · s] | | 8,200 | 6,500 | 4,600 | 5,000 | 5,400 | 9,900 | 4,500 | 4,000 | 6,000 |
| | | Solid content concentration [mass %] solid content of (A)-(C) | | 15 | 15 | 5 | 5 | 5 | 5 | 5 | 15 | 15 |
| | Electrode active material | | Type | NMC | NMC | NMC | NMC | NMC | NMC | NMC | NMC | NMC |
| | | | Amount [parts by mass] | 100 | 100 | 100 | 100 | 100 | 100 | 100 | 100 | 100 |
| | Other polymer | | Type | PVdF | PVdF | PVdF | PVdF | PVdF | PVdF | PVdF | PVdF | PVdF |
| | | | Amount [parts by mass] | 2 | 2 | 2 | 2 | 2 | 2 | 2 | 2 | 2 |
| | Conductive paste | | Amount [parts by mass] | 25 | 25 | 50 | 50 | 50 | 50 | 50 | 25 | 25 |
| | Conductive paste production enviroment | | Dew point [° C.] | −40 | −40 | −40 | −40 | −40 | −40 | −40 | −30 | −25 |
| | Evaluation | | Slurry stability | B | B | B | B | B | B | B | B | B |
| | | | Electrode peel strength | A | B | B | B | B | B | B | A | A |
| | | | Rate characteristics | B | A | A | A | A | B | B | B | B |
| | | | Internal short circuit testing | A | B | A | A | B | A | B | A | B |
| | | | High-temperature storage characteristics (capacity maintenance rate) | B | B | A | B | B | B | B | A | A |

TABLE 2

| | | | | Comparative Example 1 | Comparative Example 2 | Comparative Example 3 | Comparative Example 4 |
|---|---|---|---|---|---|---|---|
| Slurry for electrode mixed material layer | Conductive paste for electrode mixed material layer | (A) Conductive additive | Type | AB | AB | AB | AB |
| | | | Amount [parts by mass] | 100 | 100 | 100 | 100 |
| | | | Specific surface area [$m^2/g$] | 68 | 68 | 68 | 68 |
| | | (B) Polymer | Type of functional group | Nitrile group | Nitrile group | Nitrile group | Nitrile group |
| | | | Type of polymer | Polymer A | Polymer A | Polymer A | Polymer A |
| | | | Amount [parts by mass] | 25 | 220 | 220 | 30 |
| | | (C) Expandable particles | Type | Expandable particles A | Expandable particles A | Expandable particles A | Expandable particles A |
| | | | Initial thermal decomposition temperature [° C.] | 200 | 200 | 200 | 200 |
| | | | Amount [parts by mass] | 10 | 360 | 50 | 360 |
| | | | Volume-average particle diameter [μm] | 0.15 | 0.15 | 0.15 | 0.15 |
| | | Water content [ppm] | | 200 | 450 | 250 | 5,00 |
| | | Viscosity [mPa · s] | | 2,500 | 7,800 | 3,500 | 9,200 |
| | | Solid content concentration [mass %] solid content of (A)-(C) | | 15 | 5 | 10 | 10 |
| | Electrode active material | | Type | NMC | NMC | NMC | NMC |
| | | | Amount [parts by mass] | 100 | 100 | 100 | 100 |
| | Other polymer | | Type | PVdF | PVdF | PVdF | PVdF |
| | | | Amount [parts by mass] | 2 | 2 | 2 | 2 |
| | Conductive paste | | Amount [parts by mass] | 25 | 50 | 50 | 50 |
| | Conductive paste production environment | | Dew point [° C.] | −60 | −30 | −50 | −30 |
| | Evaluation | | Slurry stability | A | D | C | C |
| | | | Electrode peel strength | B | A | C | C |
| | | | Rate characteristics | B | D | C | C |
| | | | Internal short circuit testing | D | C | C | C |
| | | | High-temperature storage characteristics (capacity maintenance rate) | C | C | C | C |

| | | | | Comparative Example 5 | Comparative Example 6 | Comparative Example 7 | Comparative Example 8 |
|---|---|---|---|---|---|---|---|
| Slurry for electrode mixed material layer | Conductive paste for electrode mixed material layer | (A) Conductive additive | Type | AB | AB | AB | AB |
| | | | Amount [parts by mass] | 1.88 | 100 | 100 | 100 |
| | | | Specific surface area [$m^2/g$] | 68 | 68 | 68 | 68 |
| | | (B) Polymer | Type of functional group | — | Fluorine group | Nitrile group | Nitrile group |
| | | | Type of polymer | — | Polymer F | Polymer A | Polymer A |
| | | | Amount [parts by mass] | — | 50 | 50 | 50 |
| | | (C) Expandable particles | Type | — | Expandable particles A | Expandable particles A | — |
| | | | Initial thermal decomposition temperature [° C.] | — | 200 | 200 | — |
| | | | Amount [parts by mass] | — | 50 | 50 | — |
| | | | Volume-average particle diameter [μm] | — | 0.15 | 0.15 | — |
| | | Water content [ppm] | | — | 300 | 1200 | 1100 |
| | | Viscosity [mPa · s] | | — | 5,000 | Poor (not measurable) | 6,300 |
| | | Solid content concentration [mass %] solid content of (A)-(C) | | — | 15 | 15 | 15 |
| | Electrode active material | | Type | NMC | NMC | NMC | NMC |
| | | | Amount [parts by mass] | 100 | 100 | 100 | 100 |
| | Other polymer | | Type | PVdF | PVdF | PVdF | PVdF |
| | | | Amount [parts by mass] | 2 | 2 | 2 | 2 |
| | Conductive paste | | Amount [parts by mass] | 0 | 25 | 25 | 25 |
| | Conductive paste production environment | | Dew point [° C.] | — | −40 | −20 | −20 |
| | Evaluation | | Slurry stability | C | C | Poor | B |
| | | | Electrode peel strength | B | B | Not producible | B |
| | | | Rate characteristics | C | C | Not producible | B |
| | | | Internal short circuit testing | C | C | Not producible | D |
| | | | High-temperature storage characteristics (capacity maintenance rate) | C | C | Not producible | B |

In Table 1:

"AB" indicates acetylene black;

"CNT" indicates carbon nanotubes;

"Polymer A" indicates copolymer (NBR) of acrylonitrile and 1,3-butadiene;

"Polymer B" indicates polyvinylpyrrolidone (PVP);

"Polymer C" indicates polyvinyl butyral (PVB);

"Polymer D" indicates polyacrylonitrile (PAN);

"Polymer E" indicates copolymer (SNBR) of styrene, acrylonitrile, and 1,3-butadiene;

"Polymer F" indicates polyvinylidene fluoride "L #7200";

"PVdF" indicates polyvinylidene fluoride "L #7208"; and

"NMC" indicates active material based on lithium-containing complex oxide of Co—Ni—Mn.

In can be seen from Table 1 that a high level of safety of a lithium ion secondary battery (electrochemical device) could be ensured (Joule heat release upon internal short circuiting of the secondary battery could be inhibited and high-temperature storage characteristics (capacity maintenance rate) could be improved) in Examples 1 to 18 in which the used slurry for an electrode mixed material layer had a water content of 1,000 ppm or less and contained a conductive additive, not less than 3 parts by mass and not more than 200 parts by mass of a polymer including a prescribed functional group per 100 parts by mass of the conductive additive, and not less than 12 parts by mass and not more than 350 parts by mass of expandable particles per 100 parts by mass of the conductive additive.

INDUSTRIAL APPLICABILITY

According to the present disclosure, it is possible to provide a conductive paste for an electrode mixed material layer and a slurry for an electrode mixed material layer that can cause an electrochemical device to have a balance of excellent electrochemical characteristics and a high level of safety.

Moreover, according to the present disclosure, it is possible to provide an electrode for an electrochemical device that can be used in an electrochemical device having a balance of excellent electrochemical characteristics and a high level of safety.

Furthermore, according to the present disclosure, it is possible to provide an electrochemical device in which a high level of safety is ensured.

The invention claimed is:

1. A conductive paste for an electrode mixed material layer comprising:

a conductive additive;

a polymer in a proportional content of not less than 3 parts by mass and not more than 200 parts by mass per 100 parts by mass of the conductive additive; and expandable particles in a proportional content of not less than 12 parts by mass and not more than 350 parts by mass per 100 parts by mass of the conductive additive, wherein the polymer includes at least one functional group selected from the group consisting of a carboxyl group, a hydroxyl group, an amino group, an epoxy group, an oxazoline group, a sulfo group, a nitrile group, an ester group, and an amide group, the expandable particles have an initial thermal decomposition temperature of not lower than 120° C. and not higher than 400° C., the conductive paste has a water content of 1,000 ppm or less, the conductive paste does not comprise an electrode active material, and the conductive paste has a solid content concentration of not less than 3 mass % and not more than 50 mass %.

2. The conductive paste for an electrode mixed material layer according to claim 1, wherein the conductive additive has a specific surface area of 30 $m^2/g$ or more.

3. The conductive paste for an electrode mixed material layer according to claim 1, wherein the functional group is at least one selected from the group consisting of a carboxyl group, a hydroxyl group, and a nitrile group.

4. The conductive paste for an electrode mixed material layer according to claim 1, wherein the expandable particles have a volume-average particle diameter of not less than 0.01 μm and not more than 1.00 μm.

5. The conductive paste for an electrode mixed material layer according to claim 1, having a water content of 300 ppm or less.

6. The conductive paste for an electrode mixed material layer according to claim 1, having a viscosity of less than 10,000 mPa·s as measured under conditions of 25° C. and 6 rpm using a B-type viscometer.

7. A slurry for an electrode mixed material layer comprising: the conductive paste for an electrode mixed material layer according to claim 1; and an electrode active material.

8. An electrode for an electrochemical device comprising an electrode mixed material layer on a current collector, wherein the electrode mixed material layer is a dried product of the slurry for an electrode mixed material layer according to claim 7.

9. An electrochemical device comprising the electrode for an electrochemical device according to claim 8.

* * * * *